United States Patent
Kim et al.

(10) Patent No.: US 9,860,884 B2
(45) Date of Patent: Jan. 2, 2018

(54) METHOD FOR MONITORING CONTROL CHANNEL AND WIRELESS DEVICE

(71) Applicant: LG ELECTRONICS INC., Seoul (KR)

(72) Inventors: Hak Seong Kim, Anyang-si (KR); Han Byul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 14/357,122

(22) PCT Filed: Nov. 9, 2012

(86) PCT No.: PCT/KR2012/009494
§ 371 (c)(1),
(2) Date: May 8, 2014

(87) PCT Pub. No.: WO2013/070035
PCT Pub. Date: May 16, 2013

(65) Prior Publication Data
US 2015/0003349 A1    Jan. 1, 2015

Related U.S. Application Data

(60) Provisional application No. 61/557,898, filed on Nov. 9, 2011, provisional application No. 61/558,449, filed (Continued)

(51) Int. Cl.
*H04W 4/00*     (2009.01)
*H04W 72/04*    (2009.01)
*H04L 5/00*     (2006.01)

(52) U.S. Cl.
CPC ......... *H04W 72/042* (2013.01); *H04L 5/0048* (2013.01); *H04L 5/0053* (2013.01)

(58) Field of Classification Search
USPC ................. 370/241, 248, 252, 254, 329
See application file for complete search history.

(56) References Cited

U.S. PATENT DOCUMENTS

2012/0093063 A1    4/2012  Yuan et al.
2013/0208645 A1*   8/2013  Feng ............... H04L 5/003
                                                  370/312
(Continued)

FOREIGN PATENT DOCUMENTS

CN      102111880 A    6/2011
WO      WO 2011/035675 A1    3/2011

OTHER PUBLICATIONS

Alcatel-Lucent, Alcatel-Lucent Shanghai Bell, "PDCCH Enhancement in Rel-11", 6.6.2.2, 3GPP TSG RAN WG1 Meeting #66, R1-112421, Aug. 22-26, 2011, Athens, Greece.
(Continued)

*Primary Examiner* — Yemane Mesfin
*Assistant Examiner* — Mon Cheri Davenport
(74) *Attorney, Agent, or Firm* — Birch, Stewart, Kolasch & Birch, LLP

(57) ABSTRACT

Provided are a method for monitoring a control channel in a wireless communication system and a wireless device using the same. The wireless device monitors a downlink control channel inside a search space, which is defined by at least one pair of physical resource blocks (PRB). Indexing with respect to a plurality of enhanced control channel element (ECCE) differs depending on an ECCE-to-EREG (enhanced resource element group) mapping method.

12 Claims, 34 Drawing Sheets

Related U.S. Application Data on Nov. 11, 2011, provisional application No. 61/614,481, filed on Mar. 22, 2012, provisional application No. 61/663,542, filed on Jun. 23, 2012.

(56) References Cited

U.S. PATENT DOCUMENTS

| | | | | |
|---|---|---|---|---|
| 2014/0050159 A1* | 2/2014 | Frenne | ........... | H04W 72/042 370/329 |
| 2014/0056279 A1* | 2/2014 | Chen | ........... | H04W 52/04 370/330 |

OTHER PUBLICATIONS

ETRI, "Discussions on enhanced PDCCH structure", 6.6.2.2, 3GPP TSG RAN WG1 Meeting #66, R1-112211, pp. 1-3, Aug. 22-26, 2011, Athens, Greece.

Samsung, "Discussion on ePDCCH Design Issues", 6.6.2.2, 3GPP TSG-RAN1#66 meeting, R1-112517, pp. 1-4, Aug. 22-26, 2011, Athens Greece.

NEC Group, "DL control channel enhancements for Rel-11," 3GPP TSG RAN WG1 Meeting #66, Athens, Greece, Aug. 22-26, 2011, R1-112135, 8 pages.

Potevio, "Considerations on search space design for E-PDCCH," 3GPP TSG RAN WG1 meeting #67, R1-114130, San Francisco, USA, Nov. 14-18, 2011, 3 pages.

Samsung, "Discussion on ePDCCH Design Issues," 3GPP TSG-RAN1#66 meeting, R1-112517, Athens, Greece, Aug. 22-26, 2011, pp. 1-4.

NEC Group, "DL control channel enhancements for Rel-11," 3GPP TSG RAN WG1 Meeting #66, Aug. 22-26, 2011, 8 pages, R1-112135, XP50537307.

Potevio, "Considerations on search space design for E-PDCCH," 3GPP TSG RAN WG1 meeting #67, Nov. 14-18, 2011, 3 pages, R1-114130, XP50562105.

Huawei, HiSilicon, "Considerations on the ePDCCH design" 3GPP TSG RAN WG1 Meeting #67, R1-113655, Nov. 14-18, 2011, 5 pgs.

Intel Corporation, "Search Space Design of ePDCCH", 3GPP TSG RAN WG1 Meeting #67, R1-113949, Nov. 14-18, 2011, 4 pgs.

* cited by examiner (A)

| 0 | 1 | 2 | 3 | ... | N-1 |
|---|---|---|---|---|---|
| N | N+1 | N+2 | N+3 | | 2N-1 |
| 2N | 2N+1 | 2N+2 | 2N+3 | | 3N-1 |
| 3N | 3N+1 | 3N+2 | 3N+3 | | 4N-1 |

| 0 | 1 | 2 | 3 | ... | N-1 |
|---|---|---|---|---|---|
| N | N+1 | N+2 | N+3 | | 2N-1 |
| 2N | 2N+1 | 2N+2 | 2N+3 | | 3N-1 |
| 3N | 3N+1 | 3N+2 | 3N+3 | | 4N-1 |

| 0 | 1 | 2 | 3 | ... | N-1 |
|---|---|---|---|---|---|
| N | N+1 | N+2 | N+3 | | 2N-1 |
| 2N | 2N+1 | 2N+2 | 2N+3 | | 3N-1 |
| 3N | 3N+1 | 3N+2 | 3N+3 | | 4N-1 |

| 0 | 1 | 2 | 3 | ... | N-1 |
|---|---|---|---|---|---|
| N | N+1 | N+2 | N+3 | | 2N-1 |
| 2N | 2N+1 | 2N+2 | 2N+3 | | 3N-1 |
| 3N | 3N+1 | 3N+2 | 3N+3 | | 4N-1 |

METHOD FOR MONITORING CONTROL CHANNEL AND WIRELESS DEVICE

This application is the National Phase of PCT/KR2012/009494 filed on Nov. 9, 2012, which claims priority under 35 U.S.C. 119(e) to U.S. Provisional Application Nos. 61/557,898 filed on Nov. 9, 2011, 61/558,449 filed on Nov. 11, 2011, 61/614,481 filed on Mar. 22, 2012 and 61/663,542 filed on Jun. 23, 2012, all of which are hereby expressly incorporated by reference into the present application.

BACKGROUND OF THE INVENTION

Field of the Invention

The present invention relates to wireless communications, and more particularly, to a method of monitoring a control channel in a wireless communication system, and a wireless device using the method.

Related Art

Long term evolution (LTE) based on 3rd generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

To cope with increasing data traffic, various techniques are introduced to increase transmission capacity of a mobile communication system. For example, a multiple input multiple output (MIMO) technique using multiple antennas, a carrier aggregation technique supporting multiple cells, etc., are introduced.

A control channel designed in 3GPP LTE/LTE-A carries a variety of control information. The introduction of the new technique requires to increase capacity of the control channel and to improve scheduling flexibility.

SUMMARY OF THE INVENTION

The present invention provides a method of monitoring a downlink control channel, and a wireless device using the method.

In an aspect, a method of monitoring a control channel in a wireless communication system is provided. The method includes monitoring, by a wireless device, a downlink control channel in a search space that is defined by at least one physical resource block (PRB) pair, and receiving, by the wireless device, a downlink grant or an uplink grant on the downlink control channel. Each of the at least one PRB pair includes a plurality of enhanced resource element groups (EREGs). The search space includes a plurality of enhanced control channel elements (ECCEs). Each of the plurality of ECCEs is mapped to at least one EREG according to an ECCE-to-EREG mapping scheme. Indexing for the plurality of ECCEs varies depending on the ECCE-to-EREG mapping scheme.

The ECCE-to-EREG mapping scheme may be one of localized transmission and distributed transmission. An EREG constituting one ECCE in the localized transmission may be transmitted in one PRB pair, and an EREG constituting one ECCE in the distributed transmission may be transmitted across a plurality of PRB pairs.

The plurality of ECCEs in the localized transmission may be contiguous in one PRB pair.

In another aspect, a wireless device in a wireless communication system includes a radio frequency (RF) unit configured to transmit and receive a radio signal, and a processor operatively coupled to the RF unit and configured to monitor a downlink control channel in a search space that is defined by at least one physical resource block (PRB) pair, and receive a downlink grant or an uplink grant on the downlink control channel.

It is proposed a method of mapping a downlink control channel, in which blind decoding is performed, to a radio resource.

BRIEF DESCRIPTION OF THE DRAWINGS

FIG. 31 shows an example of distributed allocation.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
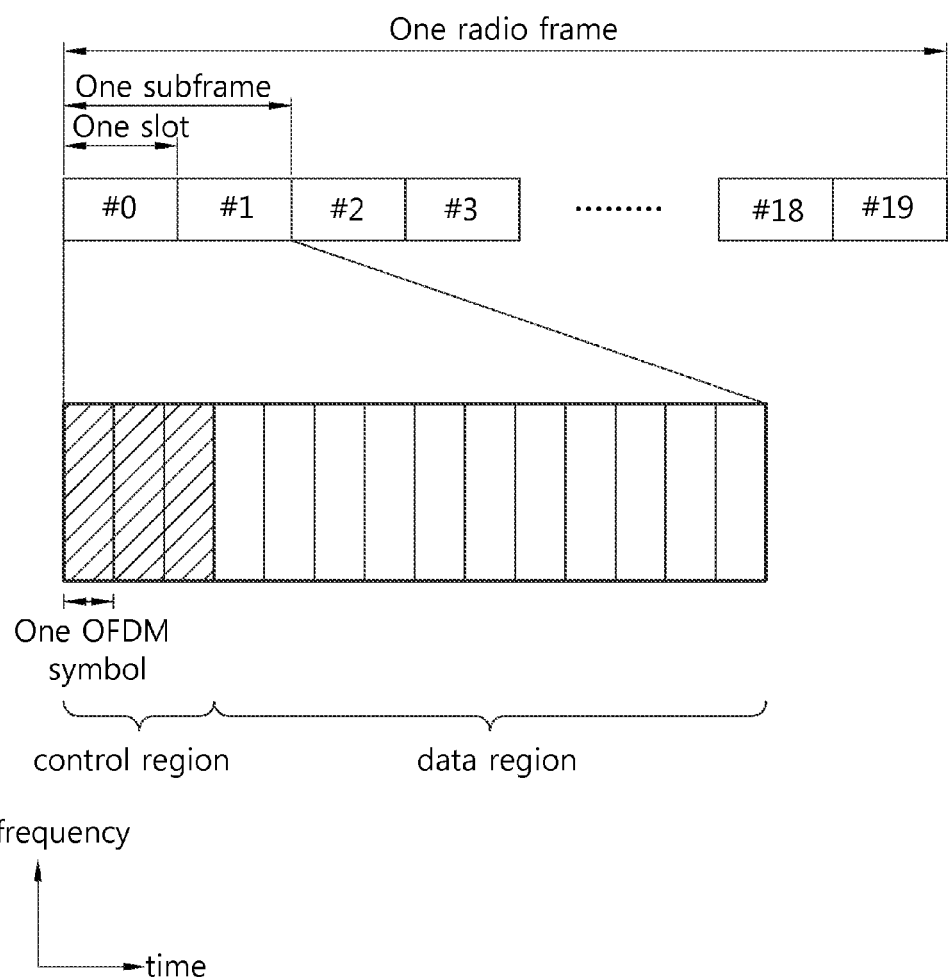
FIG. 1 shows a structure of a downlink (DL) radio frame in 3rd generation partnership project (3GPP) long term evolution-advanced (LTE-A).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V 10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7☐12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V 10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
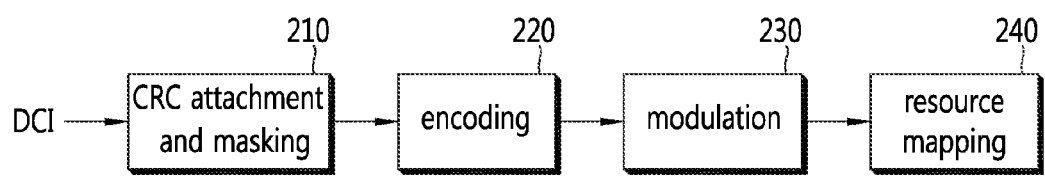
FIG. 2 is a block diagram showing a structure of a physical downlink control channel (PDCCH).

FIG. 2 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set $\{1, 2, 4, 8\}$. Each element of the set $\{1, 2, 4, 8\}$ is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
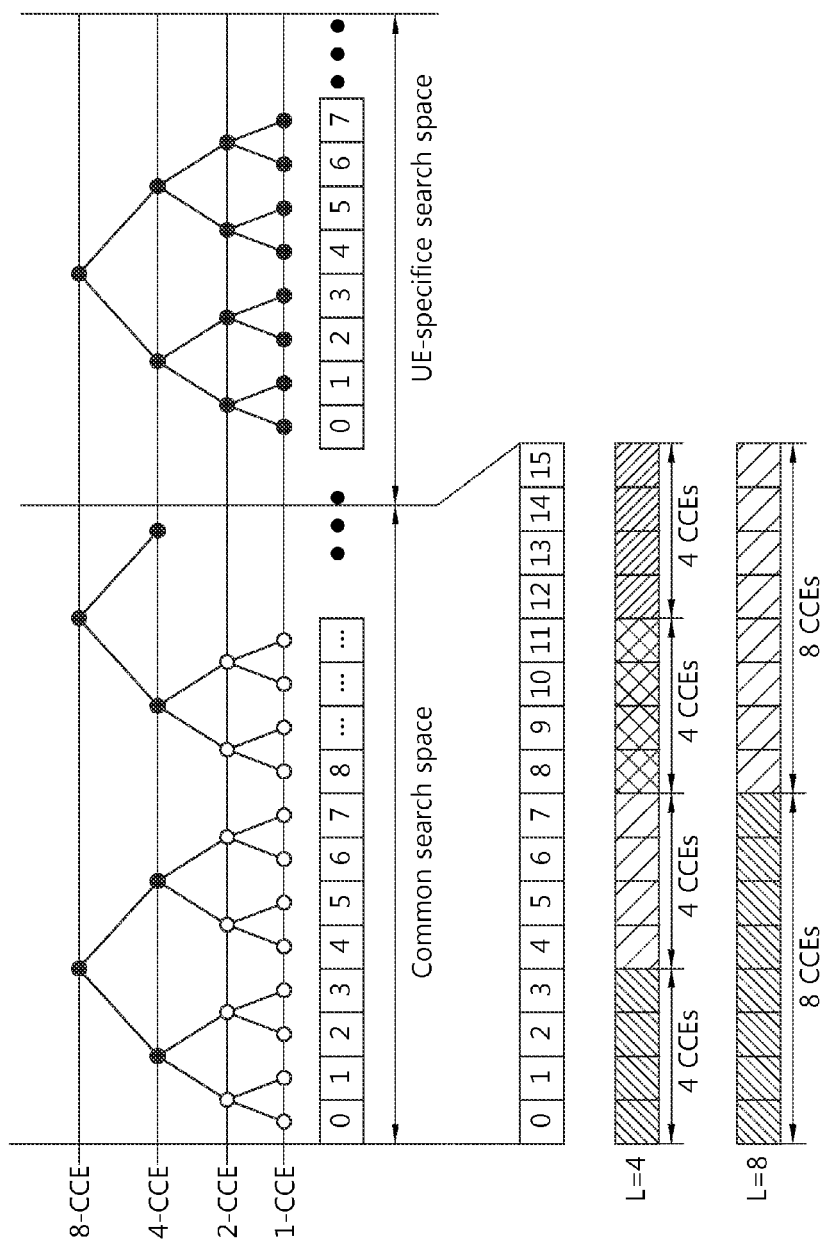
FIG. 3 shows an example of monitoring a PDCCH.

FIG. 3 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of $\{4, 8\}$. However, a PDCCH (e.g., DCI formats 0, 1A) for carrying UE-specific information can also be transmitted in the common search space. The UE-specific search space supports a PDCCH having a CCE aggregation level of $\{1, 2, 4, 8\}$.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1,2,3,4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i \qquad \text{[Equation 1]}$$

Herein, m=0, 1, . . . , L−1, m=0, . . . , $M^{(L)}$−1 and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is set to the wireless device, $m'=m+M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \qquad \text{[Equation 2]}$$

Herein, $Y_{-1}=n_{RNTI}\neq 0$, A=39827, D=65537, k=floor($n_s/2$), and $n_s$ denotes a slot number in a radio frame.

When the wireless device monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single antenna port, port 0 |
|  | DCI format 1 | UE specific | Single antenna port, port 0 |
| Mode 2 | DCI format 1A | common and UE specific | Transmit diversity |
|  | DCI format 1 | UE specific | Transmit diversity |
| Mode 3 | DCI format 1A | common and UE specific | Transmit diversity |
|  | DCI format 2A | UE specific | CDD(Cyclic Delay Diversity) or Transmit diversity |
| Mode 4 | DCI format 1A | common and UE specific | Transmit diversity |
|  | DCI format 2 | UE specific | Closed-loop spatial multiplexing |
| Mode 5 | DCI format 1A | common and UE specific | Transmit diversity |
|  | DCI format 1D | UE specific | MU-MIMO(Multi-user Multiple Input Multiple Output) |
| Mode 6 | DCI format 1A | common and UE specific | Transmit diversity |
|  | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
|  | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
|  | DCI format 2B | UE specific | Dual layer transmission (port 7 or 8), or single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having recoding and power offset information. |
| DCI format 2 | It is used for PDSCH scheduling of UEs configured to a closed-loop patial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

Figure 4:
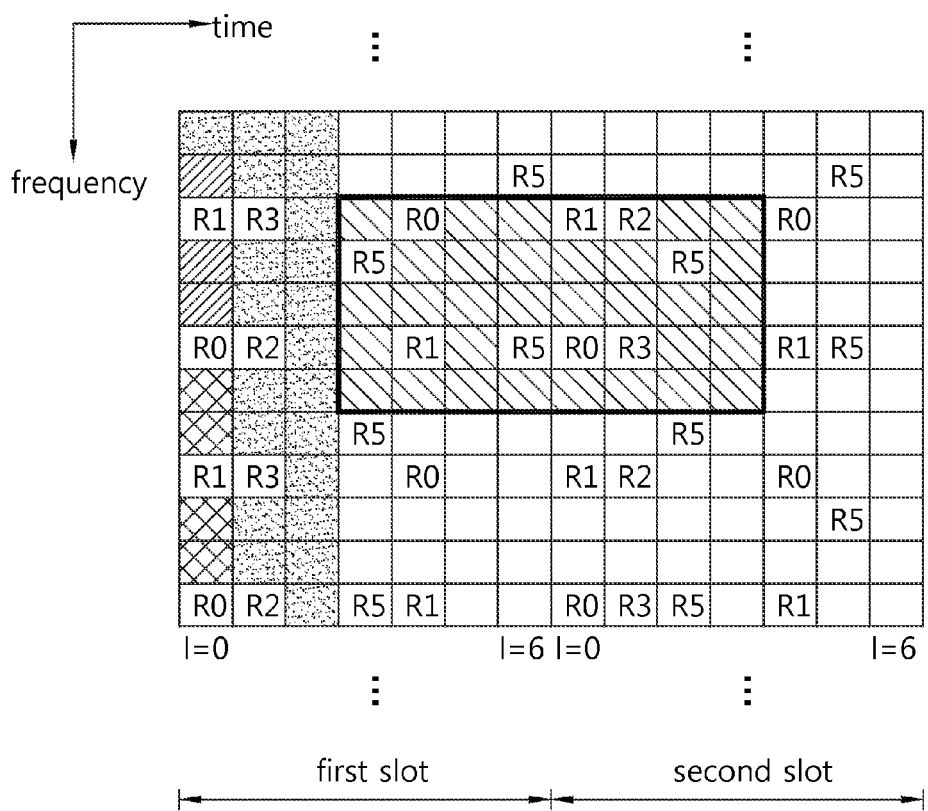
FIG. 4 shows an example of arranging a reference signal and a control channel in a DL subframe of 3GPP LTE.

FIG. 4 shows an example of arranging a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,ns}(m)$ for a CRS is defined as follows.

$$r_{l,ns}(m) = \frac{1}{\sqrt{2}}(1-2\cdot c(2m)) + j\frac{1}{\sqrt{2}}(1-2\cdot c(2m+1)) \quad \text{[Equation 3]}$$

Herein, m=0, 1, ..., $2N_{maxRB}$−1. $N_{maxRB}$ is the maximum number of RBs. ns is a slot number in a radio frame. l is an OFDM symbol index in a slot.

A pseudo-random sequence c(i) is defined by a length-31 gold sequence as follows.

$$c(n)=(x_1(n+Nc)+x_2(n+Nc))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 4]}$$

Herein, Nc=1600, and a first m-sequence is initialized as $x_1(0)=1$, $x_1(n)=0$, $m=1, 2, \ldots, 30$.

A second m-sequence is initialized as $c_{init}=2^{10}$ (7(ns+1)+ 1+1)($2N^{cell}_{ID}$+1)+2 $N^{cell}_{ID}$+$N_{CP}$ at a start of each OFDM symbol. $N^{cell}_{ID}$ is a physical cell identifier (PCI). $N_{CP}$=1 in a normal CP case, and $N_{CP}$=0 in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, $m=0, 1, \ldots, 12N_{PDSCH,RB}-1$, and $N_{PDSCH,RB}$ is the number of RBs used for transmission of a corresponding PDSCH. A pseudo-random sequence generator is initialized as $c_{init}=$(floor(ns/2)+1)(2 $N^{cell}_{ID}$+1)$2^{16}$+$n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=$(floor(ns/2)+1)(2 $N^{cell}_{ID}$+1)$2^{16}$+$n_{SCID}$ at a start of each subframe. $n_{SCID}$ is a parameter acquired from a DL grant (e.g., a DCI format 2B or 2C) related to PDSCH transmission.

The URS supports multiple input multiple output (MIMO) transmission. According to an antenna port or a layer, an RS sequence for the URS may be spread into a spread sequence as follows.

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 5:
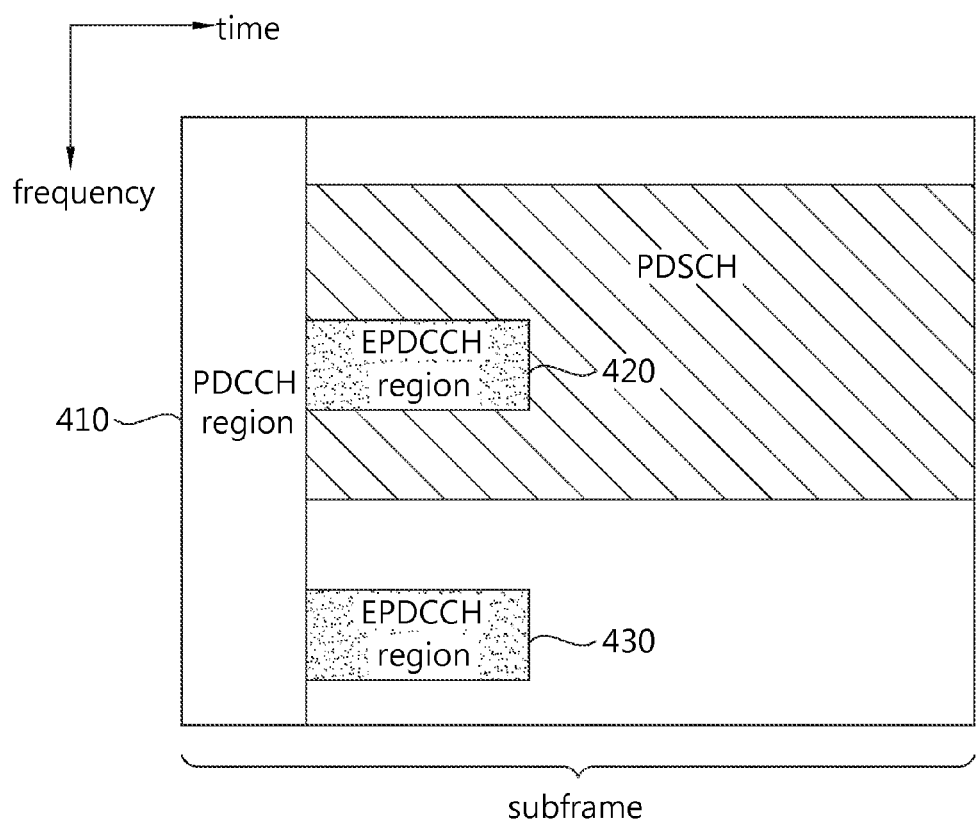
FIG. 5 is an example of a subframe having an enhanced PDCCH (EPDCCH).

FIG. 5 is an example of a subframe having an EPDCCH.

The subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 3. In this case, $m=0, 1, \ldots, 12N_{RB}-1$, and $N_{RB}$ is a maximum number of RBs. A pseudo-random sequence generator may be initialized as $c_{init}=$(floor(ns/2)+1) ($2N_{EPDCCH,ID}$+1)$2^{16}$+$n_{EPDCCH,SCID}$ at a start of each subframe. ns is a slot number of a radio frame. $N_{EPDCCH,ID}$ is a cell index related to a corresponding EPDCCH region. $n_{EPDCCH,SCID}$ is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

Hereinafter, an EPDDCH search space may correspond to an EPDCCH region. In the EPDCCH search space, one or more EPDCCH candidates may be monitored for each one or more aggregation levels.

Now, resource allocation for an EPDCCH will be described.

The EPDCCH is transmitted by using one or more ECCEs. The ECCE includes a plurality of enhanced resource element groups (EREGs). The ECCE may include 4 EREGs or 8 EREGs according to a CP and a subframe type based on a time division duplex (TDD) DL-UL configuration. For example, the ECCE includes 4 EREGs in a normal CP case, and includes 8 EREGs in an extended CP case.

A physical resource block (PRB) pair is 2 PRBs having the same RB number in one subframe. The PRB pair is a first PRB of a first slot and a second PRB of a second slot in the same frequency domain. In the normal CP case, the PRB pair includes 12 subcarriers and 14 OFDM symbols, and thus includes 168 resource elements (REs).

An EPDCCH search space may be configured with one or a plurality of PRB pairs. One PRB pair includes 16 EREGs. Therefore, if the ECCE includes 4 EREGs, the PRB pair includes 4 ECCEs, and if the ECCE includes 8 EREGs, the PRB pair includes 2 ECCEs.

Figure 6:
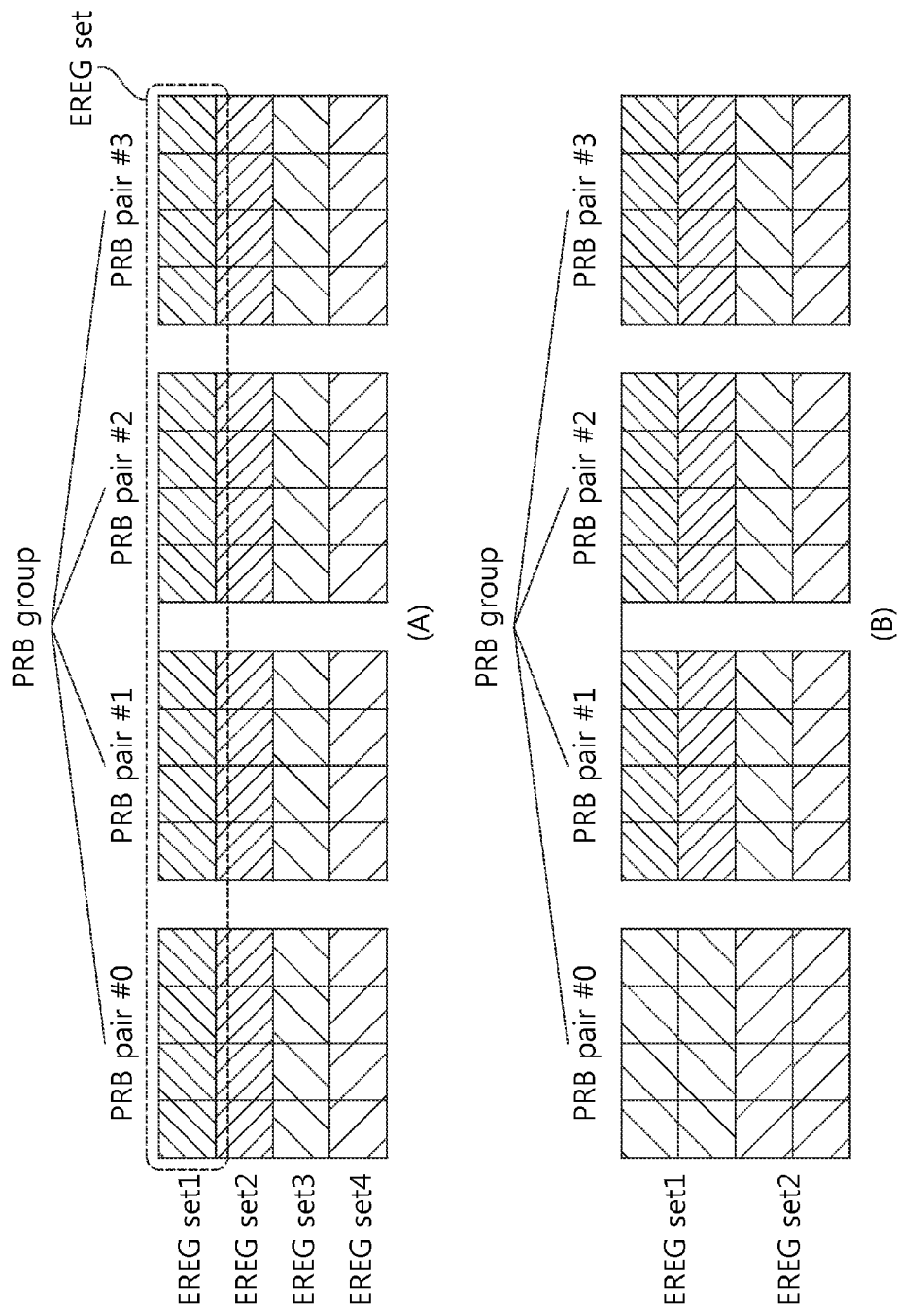
FIG. 6 shows a physical resource block (PRB) pair structure according to an embodiment of the present invention.

FIG. 6 shows a PRB pair structure according to an embodiment of the present invention. Although it is shown herein that a PRB group includes 4 PRB pairs, there is no restriction in the number of PRB pairs.

The subfigure (A) of FIG. 6 shows an EREG set when an ECCE includes 4 RREGs. The subfigure (B) of FIG. 6 shows an EREG set when an ECCE includes 8 EREGs.

It is assumed hereinafter that the ECCE includes 4 EREGs unless otherwise specified.

An EPDCCH supports localized transmission and distributed transmission. In the localized transmission, an EREG constituting one ECCE is transmitted in one PRB pair. In the distributed transmission, an EREG constituting one ECCE is transmitted in a plurality of PRB pairs.

Figure 7:
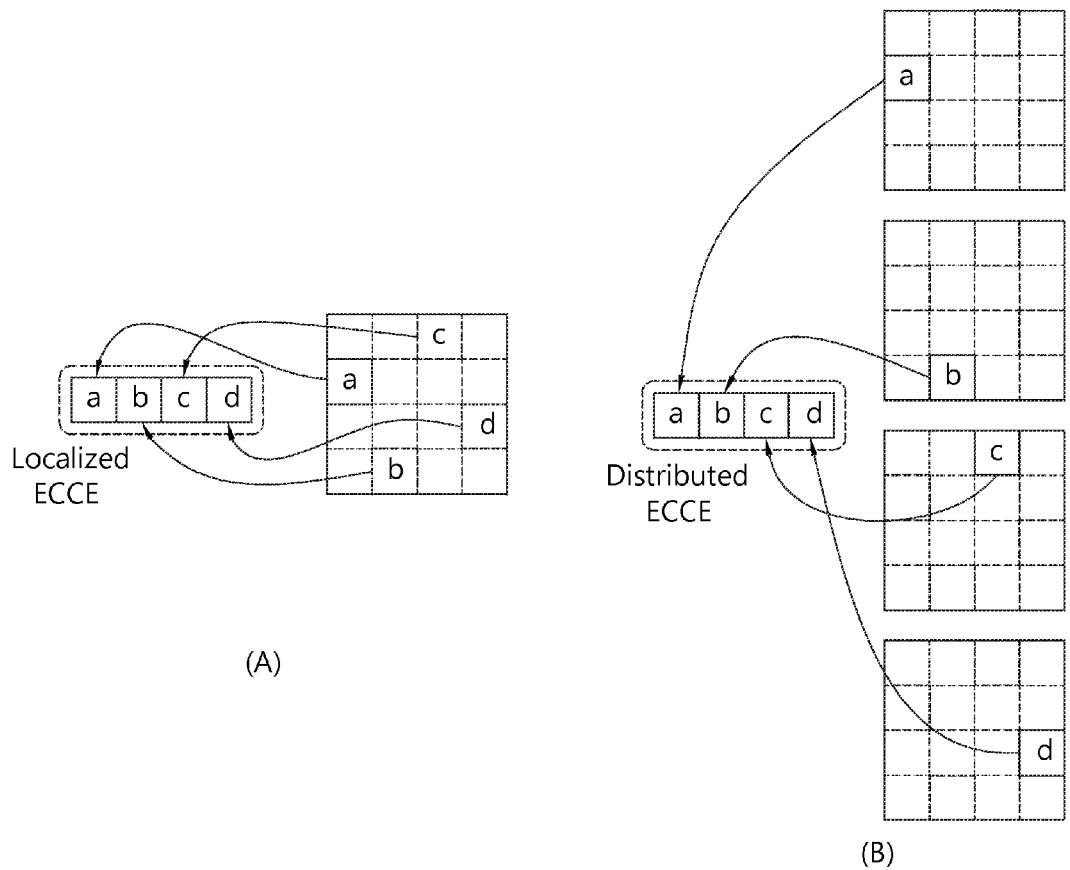
FIG. 7 shows an example of localized transmission and distributed transmission.

FIG. 7 shows an example of localized transmission and distributed transmission. The subfigure (A) of FIG. 7 shows an example of ECCE-to-EREG mapping based on localized transmission. A localized ECCE is an ECCE used in the localized transmission. The subfigure (B) of FIG. 7 shows an example of ECCE-to-EREG mapping based on distributed transmission. A distributed ECCE is an ECCE used in the distributed transmission.

An EREG set is a set of EREGs used to construct the localized ECCE or the distributed ECCE. That is, the ECCE may include EREGs belonging to the same EREG set.

The EREG set may be generalized to a subset in concept. The subset may include one or more EREGs (or one or more REs) in a PRB pair.

Figure 8:
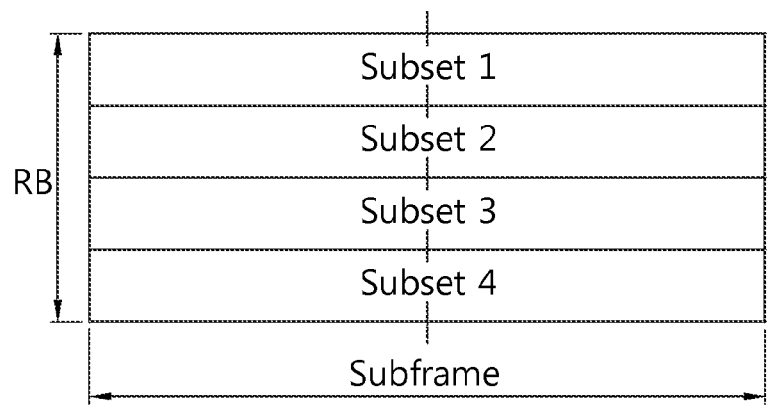
FIG. 8 shows an example of a subset.
Figure 8:
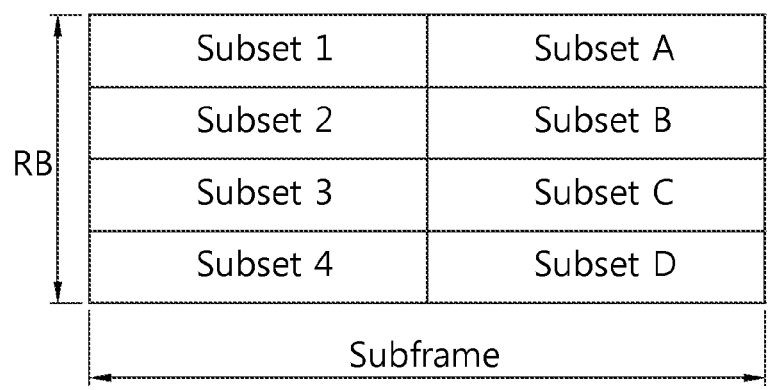

FIG. 8 shows an example of a subset. The subfigure (A) of FIG. 8 shows that a PRB pair includes 4 subsets, and the subfigure (B) of FIG. 8 shows that a PRB includes 4 subsets. A PRB of a first slot includes subsets 1, 2, 3, and 4. A PRB of a second slot includes subsets A, B, C, and D.

When comparing the subset of FIG. 8(A) with the EREG set of FIG. 6(A), one subset may correspond to an EREG set, and may also correspond to one ECCE. When assuming an aggregation level L=1 (i.e., an EPDCCH candidate is monitored in one ECCE), 4 EPDCCH candidates may be monitored in one PRB pair.

It is assumed hereinafter that a subset is included in a PRB pair, unless otherwise specified.

If multiple layers are used, the number of EPDCCHs may vary depending on the number of antenna ports of a supported DM RS. For example, assume that there are 4 subsets (i.e., S=4) and 4 antenna ports (i.e., P=4), and thus 4 layers can be supported. In this case, 4 wireless devices can be spatially multiplexed when considering orthogonality of the DM RS. For example, assume that a wireless device 1 uses an antenna port 1, and a wireless device 2 uses an antenna port 2. ABS indicates the antenna port 1 to the wireless device 1, and transmits an EPDCCH of the aggregation level L=1 to one of the 4 subsets. The wireless device 1 detects the EPDCCH by performing blind decoding on each of the 4 subsets corresponding to the antenna port 1.

Figure 9:
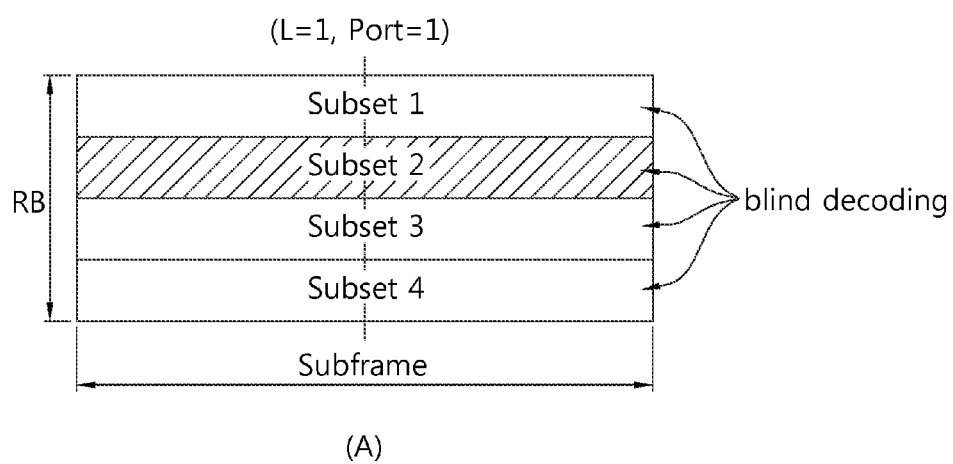
FIG. 9 shows an example of blind decoding performed by a wireless device in each subset.

FIG. 9 shows an example of blind decoding performed by a wireless device in each subset.

A BS may report information on a layer and/or an antenna port for monitoring an EPDCCH to the wireless device.

If there are 4 subsets and 4 antenna ports, and if an aggregation level L=1, then 16 ECCEs can be used throughout all layers. The layer/antenna port may be configured in unit of a wireless device group to effectively use a radio resource. For example, if 4 wireless devices exist in neighboring areas having a similar channel property and thus can form the same beam or can apply the same precoding, one antenna port can be shared. 4 EPDCCHs for the 4 wireless devices may be transmitted in the 4 subsets which exist in the same layer. If the antenna part is shared in this manner, there is an advantage in that 16 EPDCCHs can be transmitted in one PRB pair through 16 ECCEs.

The following example shows that an antenna port and a subset are allocated to each wireless device in a case where the number of subsets is S and the number of antenna ports is P. It is assumed that a BS reports an antenna port to each wireless device, and the wireless device and the antenna port are 1:1 mapped. The wireless device (WD) performs blind decoding on the subset at a corresponding aggregation level L. Therefore, it can be regarded that whole subsets correspond to an EPDCCH search space.

Figure 10:
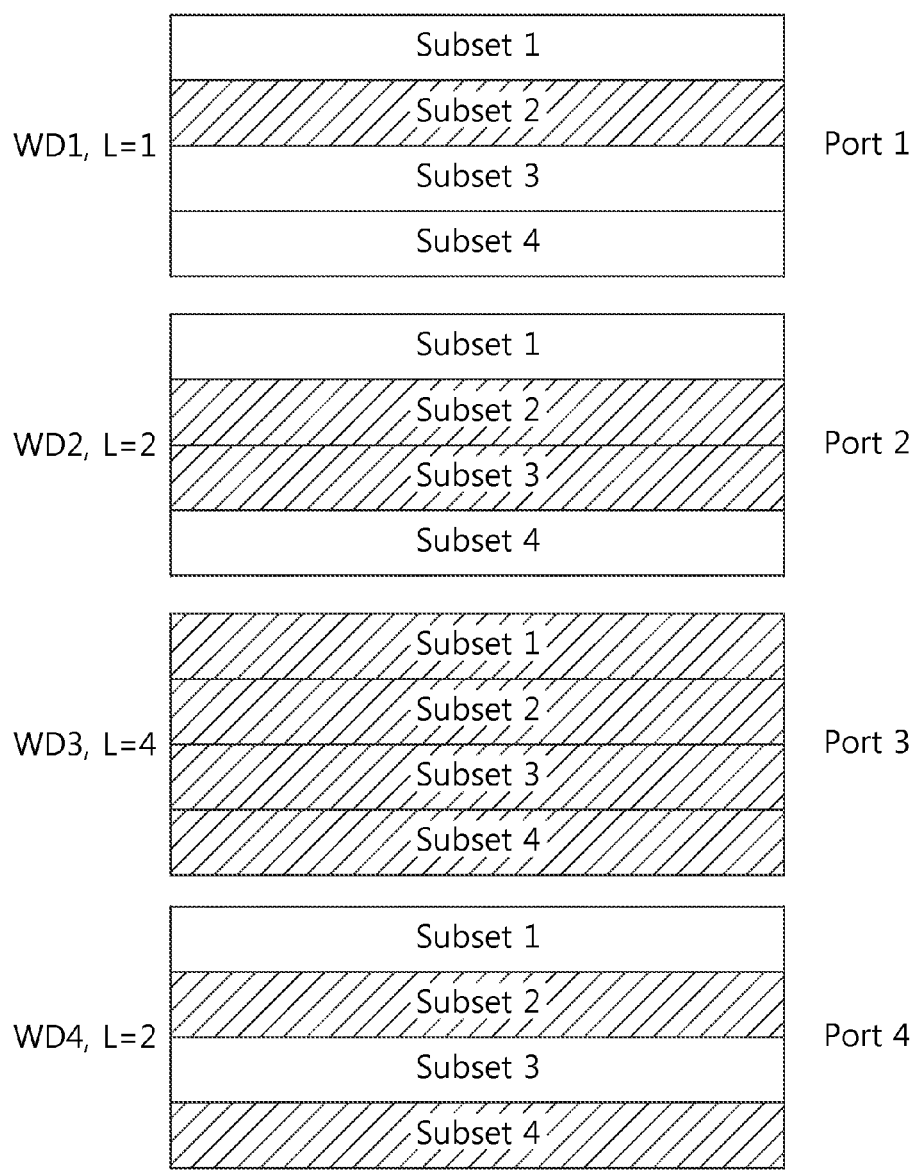
FIG. 10 shows an example of blind decoding.

Example 1) S=2, P=4, L=1
WD1=antenna port 1+subset 1 or 2
WD2=antenna port 2+subset 1 or 2
WD3=antenna port 3+subset 1 or 2
WD4=antenna port 4+subset 1 or 2
Example 2) S=3, P=4, L=1 or 2
WD1=antenna port 1+one(L=1) or two(L=2) subsets among 3 subsets
WD2=antenna port 2+one(L=1) or two(L=2) subsets among 3 subsets
WD3=antenna port 3+one(L=1) or two(L=2) subsets among 3 subsets
WD4=antenna port 4+one(L=1) or two(L=2) subsets among 3 subsets
Example 3) S=4, P=4, L=1, 2 or 4
WD1=antenna port 1+one(L=1) or two(L=2) or four(L=4) subsets among 4 subsets
WD2=antenna port 2+one(L=1) or two(L=2) or four(L=4) among 4 subsets
WD3=antenna port 3+one(L=1) or two(L=2) or four(L=4) among 4 subsets
WD4=antenna port 4+one(L=1) or two(L=2) or four(L=4) among 4 subsets FIG. 10 shows an example of blind decoding. Herein, S=4, P=4, and the example 3 is depicted.

A WD1 receives its EPDCCH in case of using an antenna port 1, L=1, and a subset 2.

A WD2 receives its EPDCCH in case of using an antenna port 2, L=2, and subsets 2 and 3.

A WD3 receives its EPDCCH in case of using an antenna port 3, L=4, and subsets 1 to 4. A WD4 receives its EPDCCH in case of using an antenna port 4, L=2, and subsets 2 and 4.

An example 4 below shows an antenna port and subset allocation when a DM RS is shared by two wireless devices.

When the DM RS is shared, two wireless devices may be allocated to one antenna port. Herein, it is assumed that the DM RS is shared by the WD1 and a WD5, the WD2 and a WD6, the WD3 and a WD7, and the WD4 and a WD8.

Example 4) S=2, P=4, L=1
WD1=antenna port 1+subset 1 or 2
WD5=antenna port 1+subset 1 or 2
WD2=antenna port 2+subset 1 or 2
WD6=antenna port 2+subset 1 or 2
WD3=antenna port 3+subset 1 or 2
WD7=antenna port 3+subset 1 or 2
WD4=antenna port 4+subset 1 or 2
WD8=antenna port 4+subset 1 or 2

The wireless device monitors the EPDCCH in a PRB pair in a determined location, by using a pre-determined antenna port. Flexible EPDCCH monitoring is possible by properly assigning an antenna port and/or a subset to a plurality of wireless devices.

Figure 11:
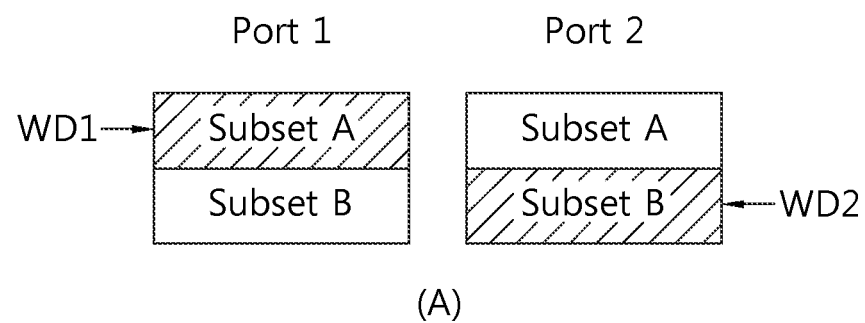
FIG. 11 shows an example of EPDCCH monitoring of two wireless devices.
Figure 11:
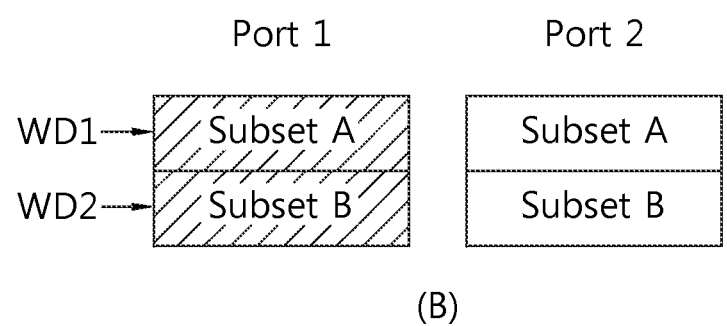
Figure 11:
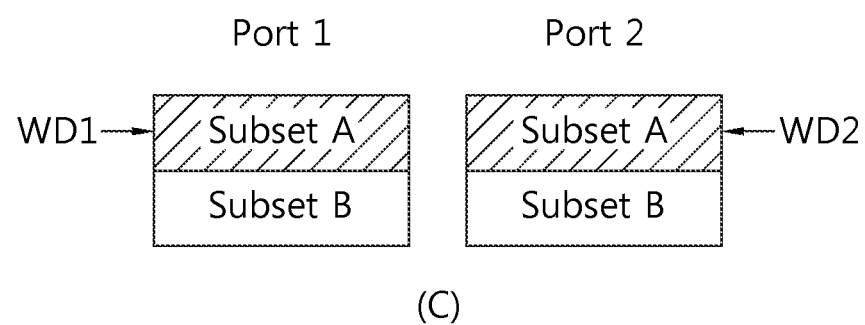

FIG. 11 shows an example of EPDCCH monitoring of two wireless devices.

Referring to the subfigure (A) of FIG. 11, two wireless devices, i.e., a WD1 and a WD2, receive an EPDCCH in different subsets at different antenna ports. The WD1 receives the EPDCCH in a subset A of an antenna port 1. The WD2 receives the EPDCCH in a subset B of an antenna port 2.

A BS may perform beamforming optimized to each wireless device. Each wireless device receives the EPDCCH by using orthogonal resources.

Referring to the subfigure (B) of FIG. 11, two wireless devices, i.e., a WD1 and a WD2, receive an EPDCCH in different subsets at the same antenna port. The WD1 receives the EPDCCH in a subset A of an antenna port 1. The WD2 receives the EPDCCH in a subset B of an antenna port 1. A DM RS may be shared by the WD1 and the WD2, and thus an RS overhead can be reduced.

Referring to the subfigure (C) of FIG. 11, two wireless devices, i.e., a WD1 and a WD2, receive an EPDCCH in the same subset at different antenna ports. The WD1 receives the EPDCCH in a subset A of an antenna port 1. The WD2 receives the EPDCCH in a subset A of an antenna port 2.

A BS is configured to transmit the E-PDCCH by using MU-MIMO. Each wireless device may be separated by precoding, and thus there is an advantage in that the number of subsets in use can be decreased.

Now, a case of supporting an aggregation level L (e.g., L=2, 4, 8, 16) higher than L=1 is described.

For example, if it is assumed that the number of subsets is S=2 and the number of antenna ports is P=4, a unique resource region may be allocated to the wireless device by using a combination of an antenna port index, a subset index, and a PRB index. Examples of the possible combination are as follows.

i) A plurality of subsets are allocated to the same antenna port in a localized transmission or distributed transmission manner.

ii) The same subset is allocated to different antenna ports in a localized transmission or distributed transmission manner.

iii) Different subsets are allocated to different antenna ports in a localized transmission or distributed transmission manner.

Figure 12:
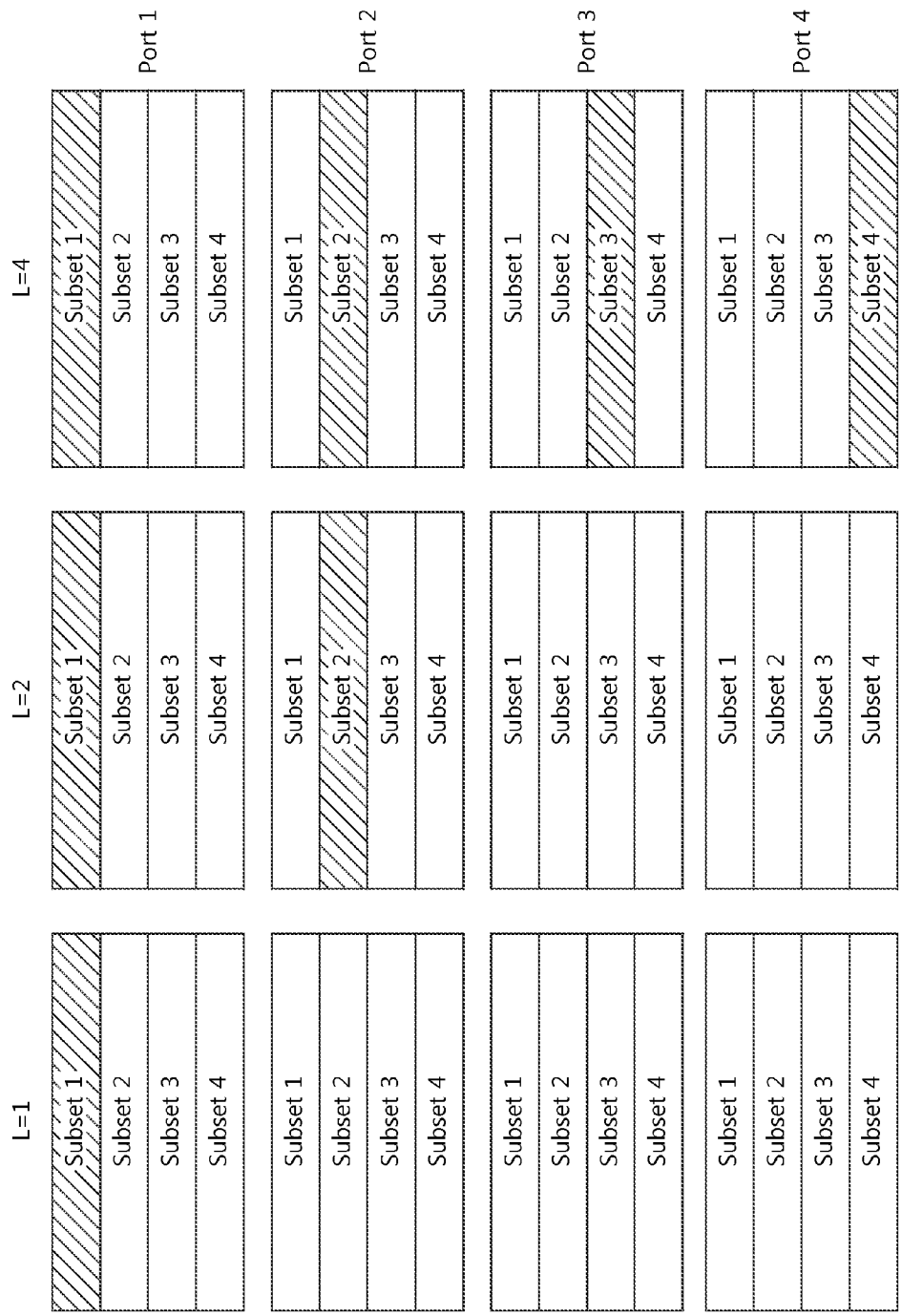
FIG. 12 and FIG. 13 are examples of configuring an aggregation level by using different subsets at different antenna ports.
Figure 13:
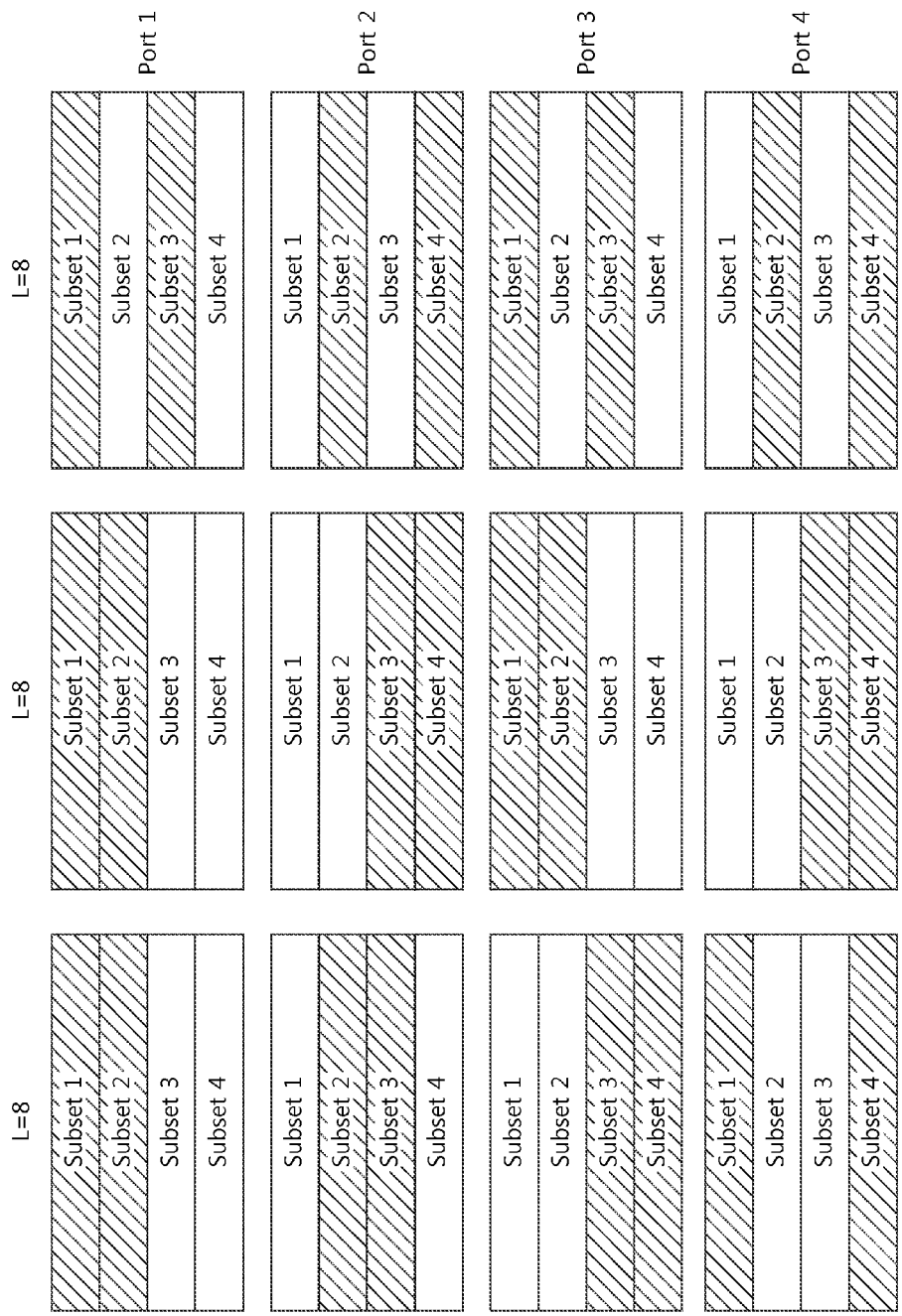

FIG. 12 and FIG. 13 are examples of configuring an aggregation level by using different subsets at different antenna ports. A case of L=1, 2, 4 is shown in FIG. 12, and a case of L=8 is shown in FIG. 13.

The proposed method is described above by taking a frequency division multiplexing (FDM)-based subset partitioning for example, and is also directly applicable to time division multiplexing (TDM)-based subset partitioning which is achieved on an OFDM symbol basis.

In an example 5 below, an aggregation level is configured by combining an antenna port, a PRB pair (or PRB), and a subset. Although four PRB pairs (i.e., PRB1, PRB2, PRB3, PRB4) are considered herein, the number of PRB pairs is for exemplary purposes only.

Example 5) S=4, P=4,
L=4 of WD1: Subset 1 of PRB1, Subset 1 of PRB11, Subsea of PRB3, Subset 1 of PRB4
L=4 of WD2: Subset 1 of PRB1 2, Subset 2 of PRB2, Subset 2 of PRB3, Subset 2 of PRB4
L=4 of WD3: Subset 3 of PRB 1, Subset 3 of PRB2, Subset 3 of PRB3, Subset 3 of PRB4
L=4 of WD4: Subset 4 of PRB 1, Subset 4 of PRB2, Subset 4 of PRB3 4, Subset 4o of PRB4

Figure 14:
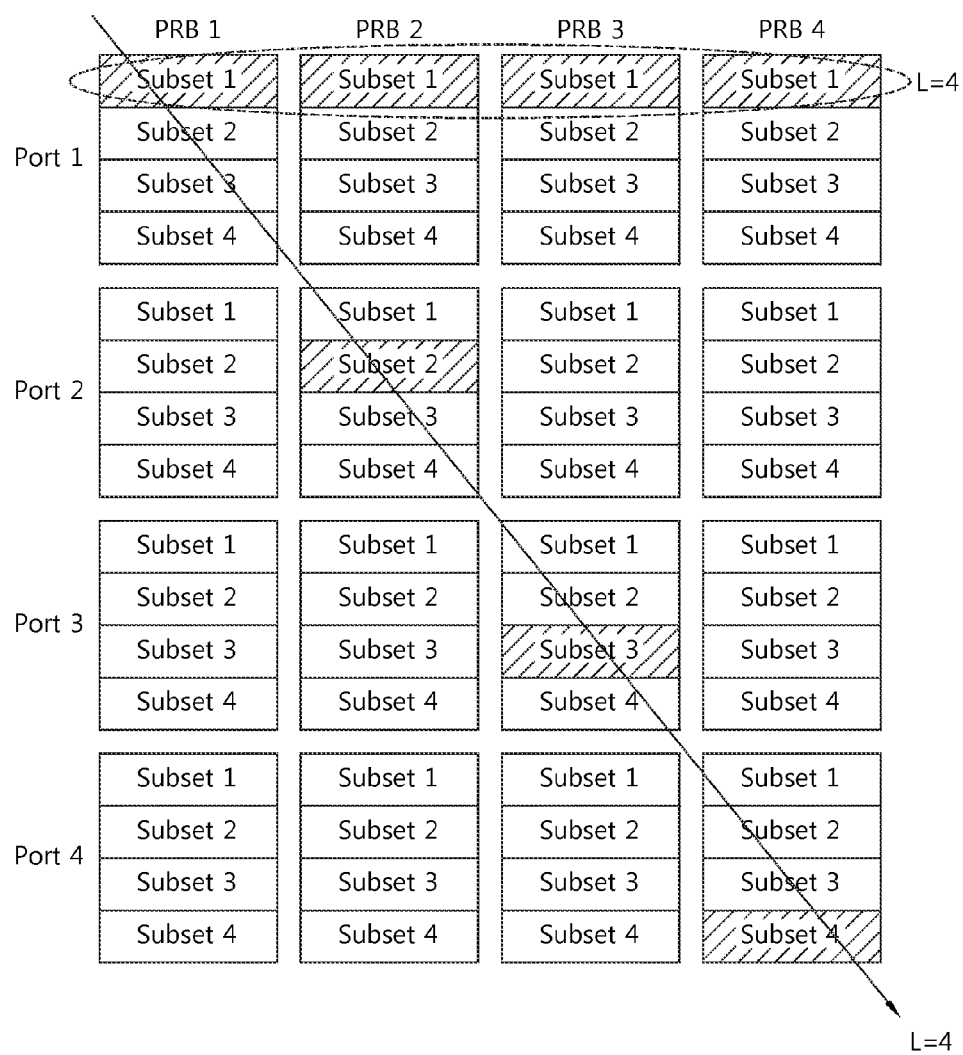
FIG. 14 shows an example of configuring an aggregation level.

FIG. 14 shows an example of configuring an aggregation level.

In this example, an EPDCCH having an aggregation level L=4 is configured with (a subset 1 of PRB 1, a subset 1 of PRB2, a subset 1 of PRB3, a subset 1 of PRB4) at the same antenna port, or an EPDCCH having an aggregation level L=4 is configured with (a subset 1 of PRB 1, a subset2 of PRB2, a subset 3 of PRB3, a subset4 of PRB4) at different antenna ports.

Now, a method of configuring a location of an EPDCCH candidate on the basis of an aggregation level in a search space is described.

Figure 15:
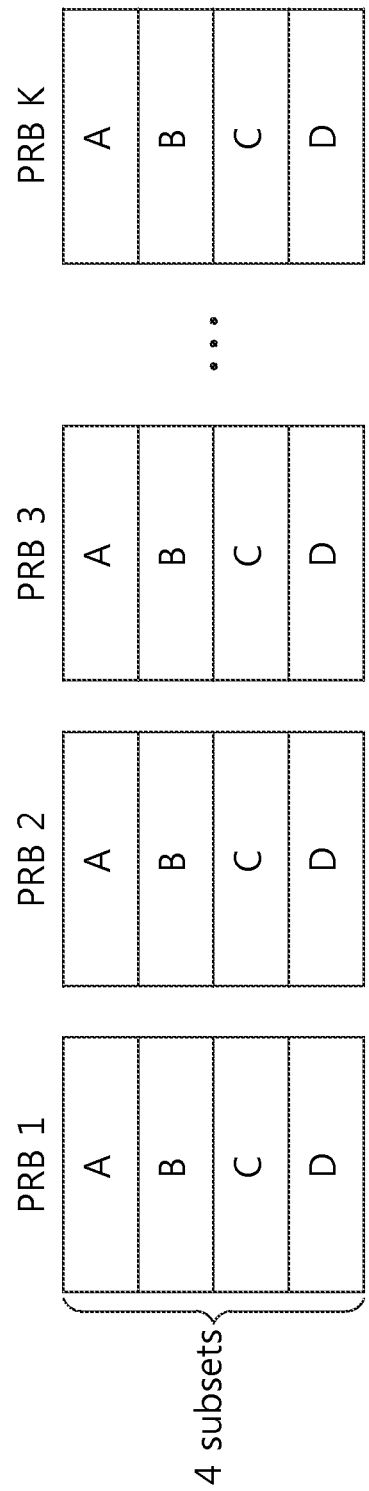
FIG. 15 shows a subset configured in a PRB pair.

FIG. 15 shows a subset configured in a PRB pair.

There are K PRB pairs (i.e., PRB1, . . . , PRB_K), and each PRB pair includes 4 subsets.

Figure 16:
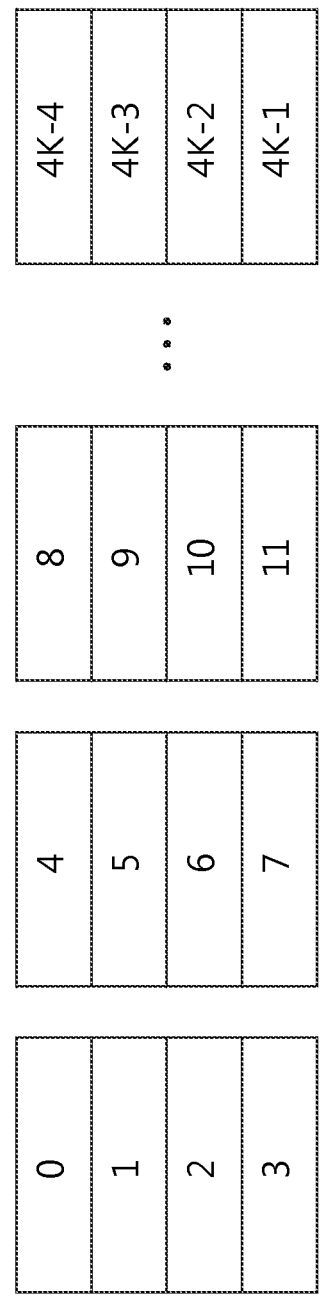
FIG. 16 shows a case where a logical index is assigned to the subset of FIG. 15.

FIG. 16 shows a case where a logical index is assigned to the subset of FIG. 15. Since there are 4K subsets in K PRB pairs, the logical index may be assigned sequentially from 0 to 4K−1.

Figure 17:
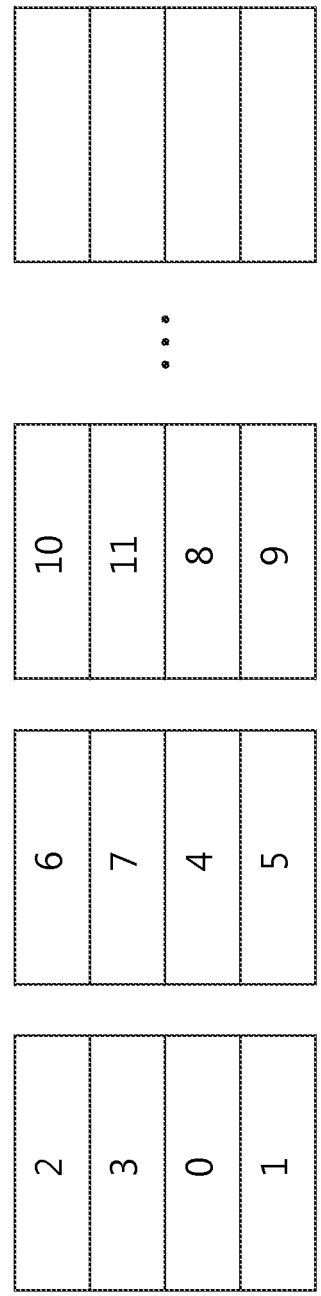
FIG. 17 shows an example of applying a cyclic shift to the logical index of FIG. 16.

FIG. 17 shows an example of applying a cyclic shift to the logical index of FIG. 16. Herein, the logical index for a subset of each PRB pair is cyclically shifted by 2.

Although the same cyclic shift offset is applied for each PRB, this is for exemplary purposes only. A different cyclic shift offset may be applied for each PRB. Information on the cyclic shift offset may be transmitted by a BS to a wireless device by using an RRC message or the like.

Figure 18:
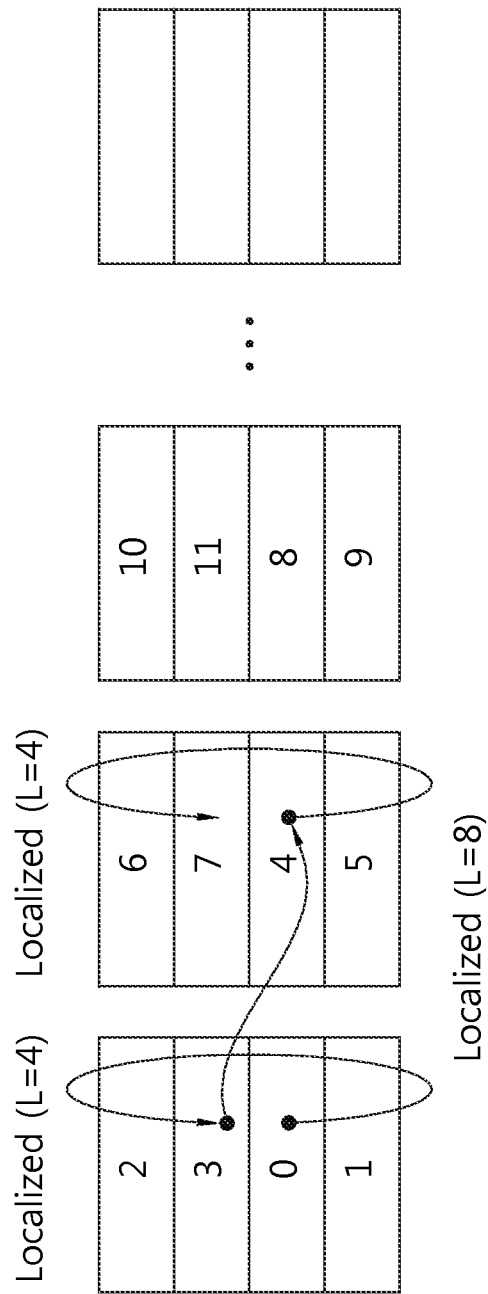
FIG. 18 shows an example of a method of configuring an aggregation level when localized transmission is determined.

FIG. 18 shows an example of a method of configuring an aggregation level when localized transmission is determined.

If L=4, an EPDCCH candidate may be constructed with subsets having indices 0, 1, 2, and 3 or subsets having indices 4, 5, 6, and 7. If L=8, the EPDCCH candidate may be constructed with subsets having indices 0 to 7.

If localized transmission is determined, the aggregation level may be configured with a group of subsets having contiguous indices.

In an aggregation level L, a start of a subset for an nth EPDCCH candidate may be a subset having an index L*(n−1) (n=1, 2, . . . ). Alternatively, if an offset 'a' is defined, the start of the subset for the nth EPDCCH candidate may be a subset having an index L*(n−1)+a.

Figure 19:
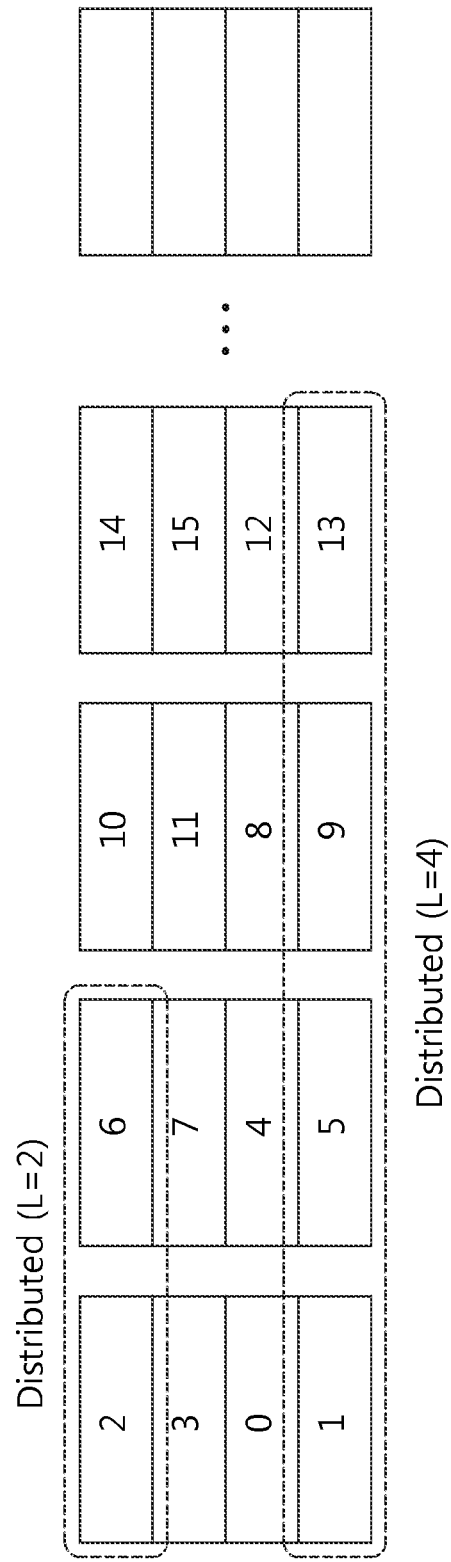
FIG. 19 shows an example of a method of configuring an aggregation level when distributed transmission is determined.

FIG. 19 shows an example of a method of configuring an aggregation level when distributed transmission is determined.

If L=2, an EPDCCH candidate may be constructed with a subset corresponding to an index 2 of a PRB1 and a subset corresponding to an index 6 of a PRB2. If L=4, the EPD- CCH candidate may be constructed with a subset corresponding to an index 1 of the PRB1, a subset corresponding to an index 5 of the PRB2, a subset corresponding to an index 9 of a PRB3, and a subset corresponding to an index 13 of a PRB4.

When the distributed transmission is determined, the aggregation level may be configured with subsets belonging to different PRB pairs.

Figure 20:
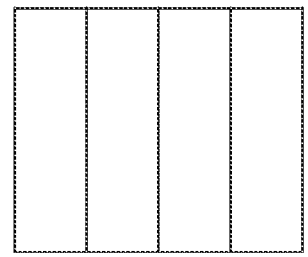
FIG. 20 is another example of applying a cyclic shift to the logical index of FIG. 16.
Figure 20:
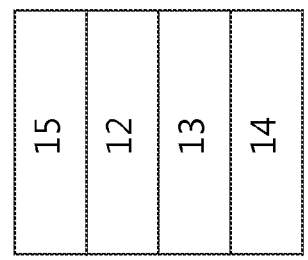
Figure 20:
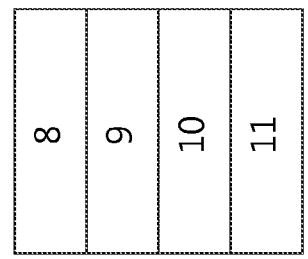
Figure 20:
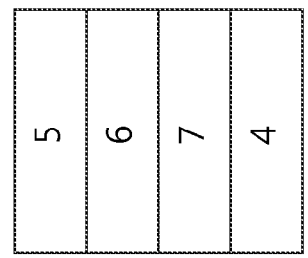
Figure 20:
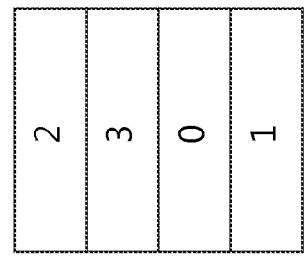

FIG. 20 is another example of applying a cyclic shift to the logical index of FIG. 16. It is shown herein that the cyclic shift of the logical index is applied for each PRB pair.

It is shown that a cyclic shift offset 2 is applied to a PRB1, a cyclic shift offset 3 is applied to a PRB2, a cyclic shift offset 0 is applied to a PRB3, and a cyclic shift offset 1 is applied to a PRB4.

The cyclic shift offset may be reported by a BS to a wireless device. Alternatively, the cyclic shift offset may be determined based on a PRB pair index (or a PRB index). An example of determining a cyclic shift offset to (PRB pair index+1) mod 4 is shown in FIG. 20.

Figure 21:
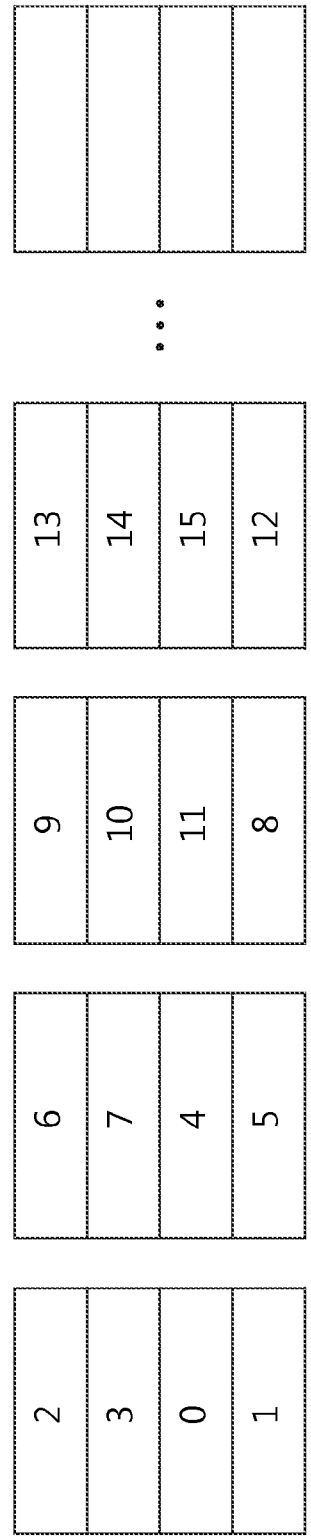
FIG. 21 is another example of applying a cyclic shift to the logical index of FIG. 16.

FIG. 21 is another example of applying a cyclic shift to the logical index of FIG. 16. It is shown herein that the cyclic shift of the logical index is applied for each group of PRB pairs.

In this example, when it is assumed that a group 1 includes a PRB 1 and a PRB2, and a group 2 includes a PRB3 and a PRB4, a cyclic shift offset 2 is applied for a PRB pair belonging to the group 1, and a cyclic shift offset 1 is applied for a PRB pair belonging to the group 2.

The cyclic shift offset for each group may be reported by a BS to a wireless device. The cyclic shift offset for each group may be determined based on at least any one of a group index, a PRB pair index, and a PRB index.

Figure 22:
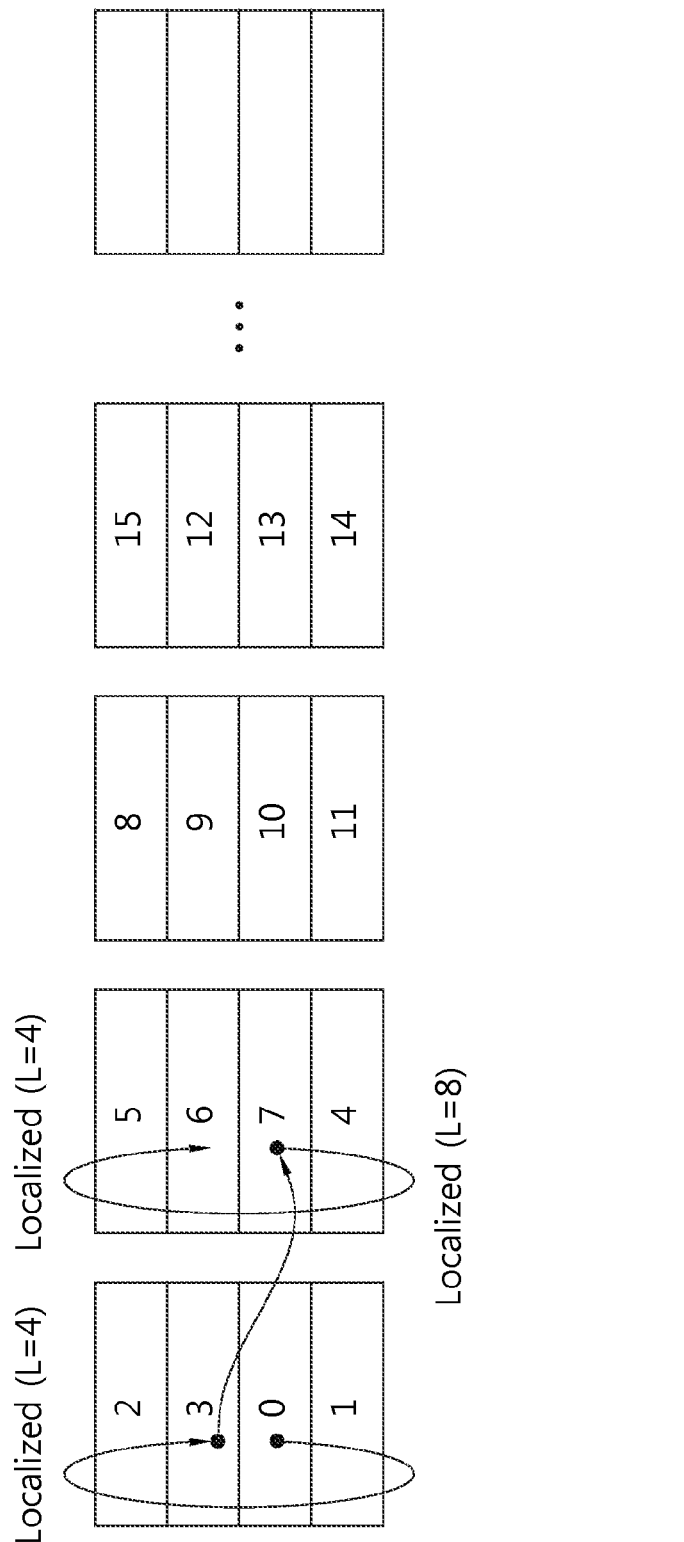
FIG. 22 shows an example of a method of configuring an aggregation level when localized transmission is determined based on the logical index of FIG. 20.

FIG. 22 shows an example of a method of configuring an aggregation level when localized transmission is determined based on the logical index of FIG. 20.

Figure 23:
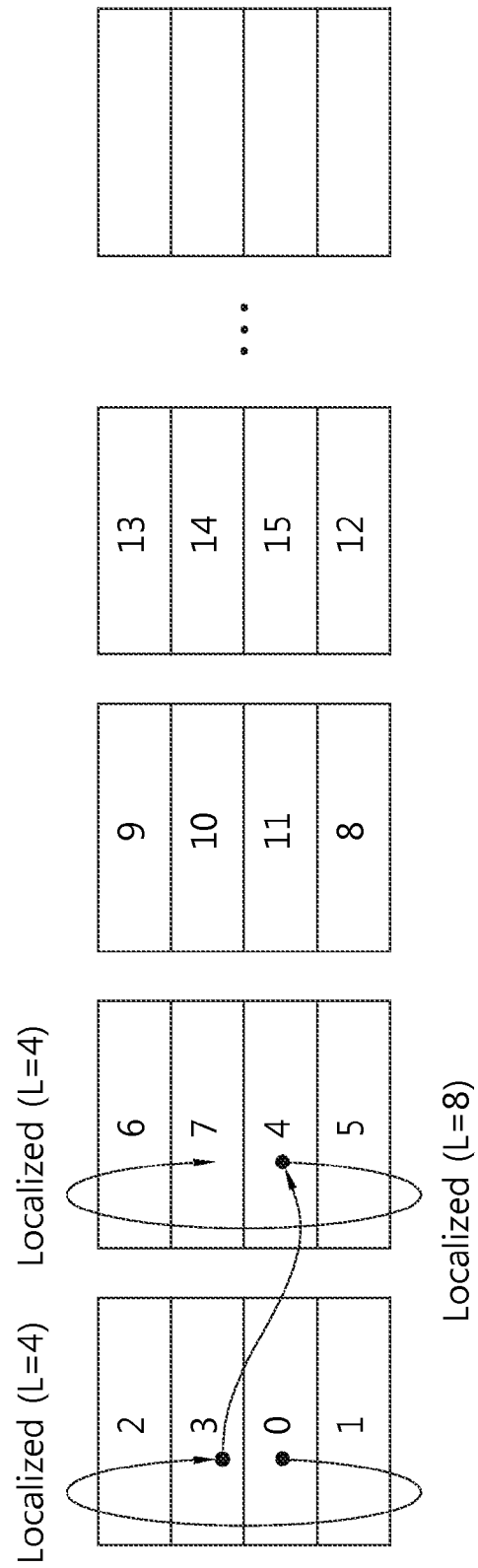
FIG. 23 shows an example of a method of configuring an aggregation level when localized transmission is determined based on the logical index of FIG. 21.

FIG. 23 shows an example of a method of configuring an aggregation level when localized transmission is determined based on the logical index of FIG. 21.

Figure 24:
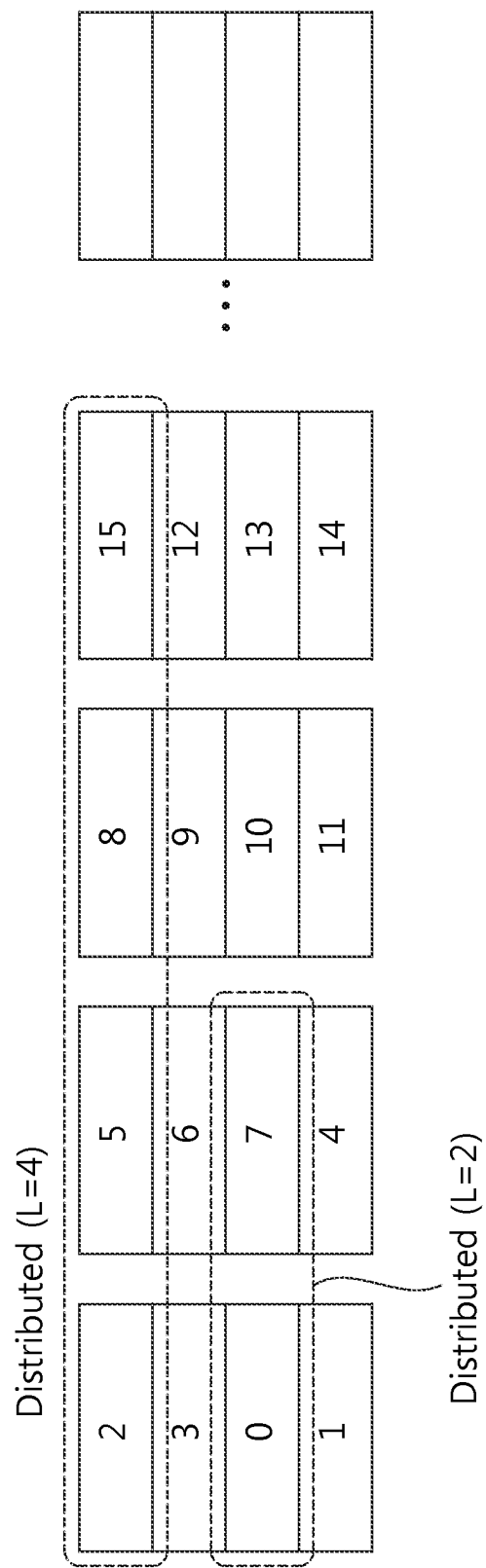
FIG. 24 shows an example of a method of configuring an aggregation level when distributed transmission is determined based on the logical index of FIG. 20.

FIG. 24 shows an example of a method of configuring an aggregation level when distributed transmission is determined based on the logical index of FIG. 20.

Figure 25:
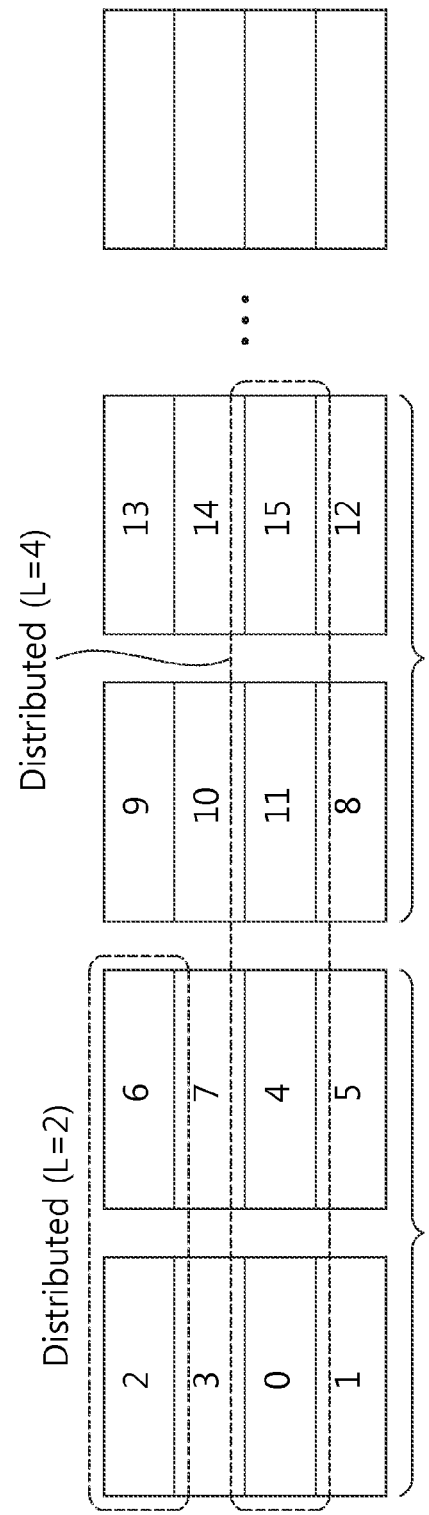
FIG. 25 shows an example of a method of configuring an aggregation level when distributed transmission is determined based on the logical index of FIG. 21.

FIG. 25 shows an example of a method of configuring an aggregation level when distributed transmission is determined based on the logical index of FIG. 21.

Figure 26:
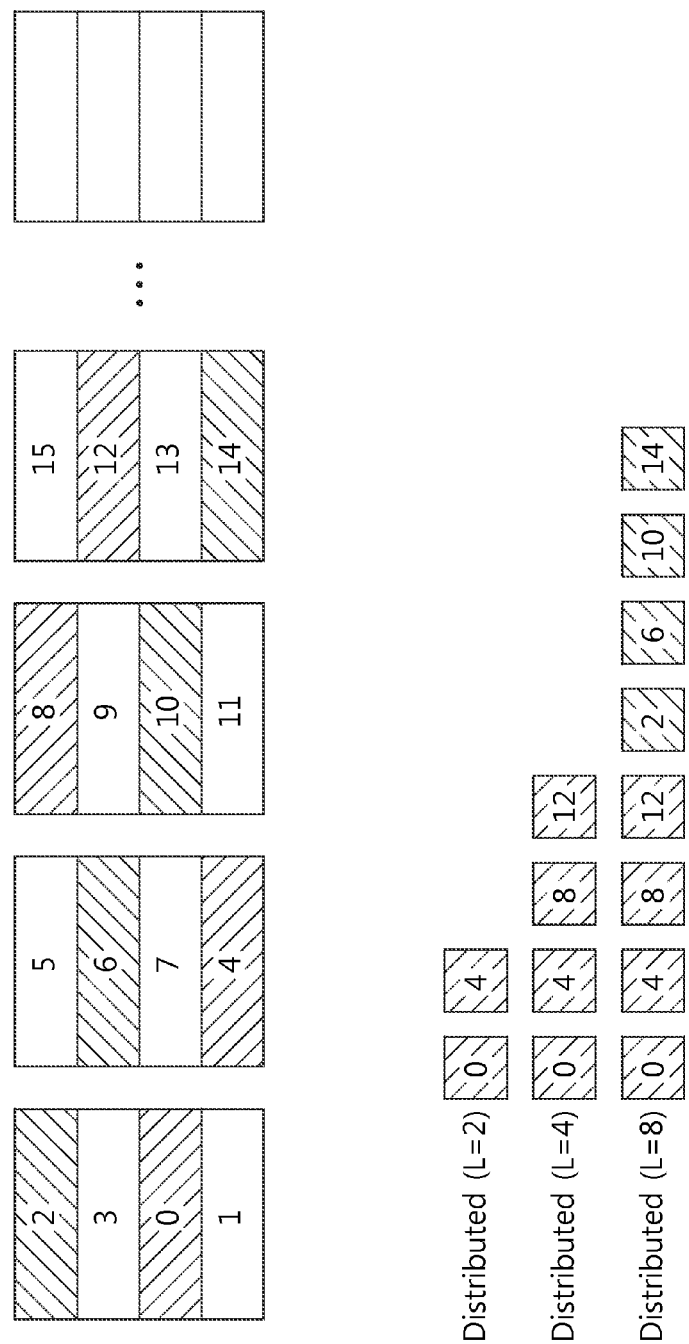
FIG. 26 shows another example of a method of configuring an aggregation level when distributed transmission is determined based on the logical index of FIG. 20.

FIG. 26 shows another example of a method of configuring an aggregation level when distributed transmission is determined based on the logical index of FIG. 20.

It is assumed that, if L={0, 4, 8}, a start point is a subset having an index 0.

If L=2, a subset index {0, 4} is selected. If L=4, a subset index {0, 4, 8, 12} is selected. If L=8, a subset index {0, 4, 8, 12, 2, 6, 10, 14} is selected.

If a PRB group includes a PRB1, a PRB2, a PRB3, and a PRB4, the subset index may be divided into two groups, i.e., {0, 4, 8, 12} and {2, 6, 10, 14}. In this case, if L=8, the subset index may be selected such as {0, 2, 4, 6, 8, 10, 12, 14}.

Figure 27:
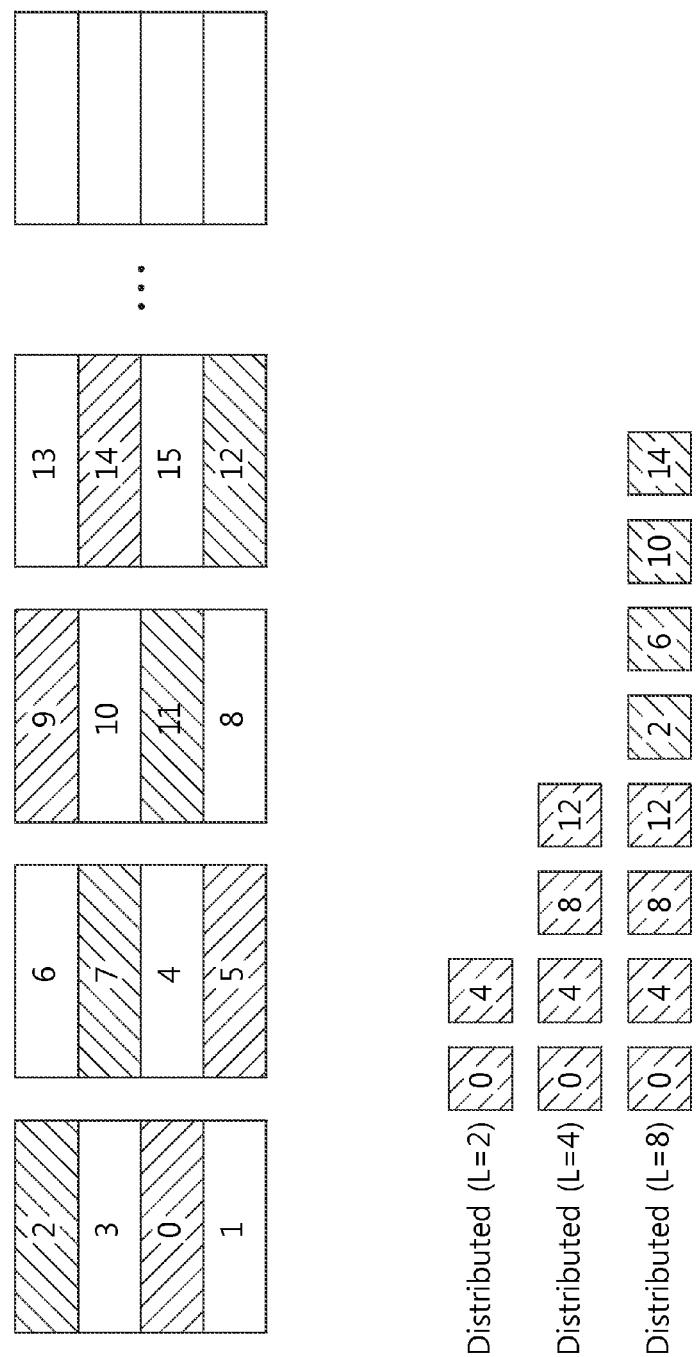
FIG. 27 shows another example of a method of configuring an aggregation level when distributed transmission is determined based on the logical index of FIG. 21.

FIG. 27 shows another example of a method of configuring an aggregation level when distributed transmission is determined based on the logical index of FIG. 21.

Figure 28:
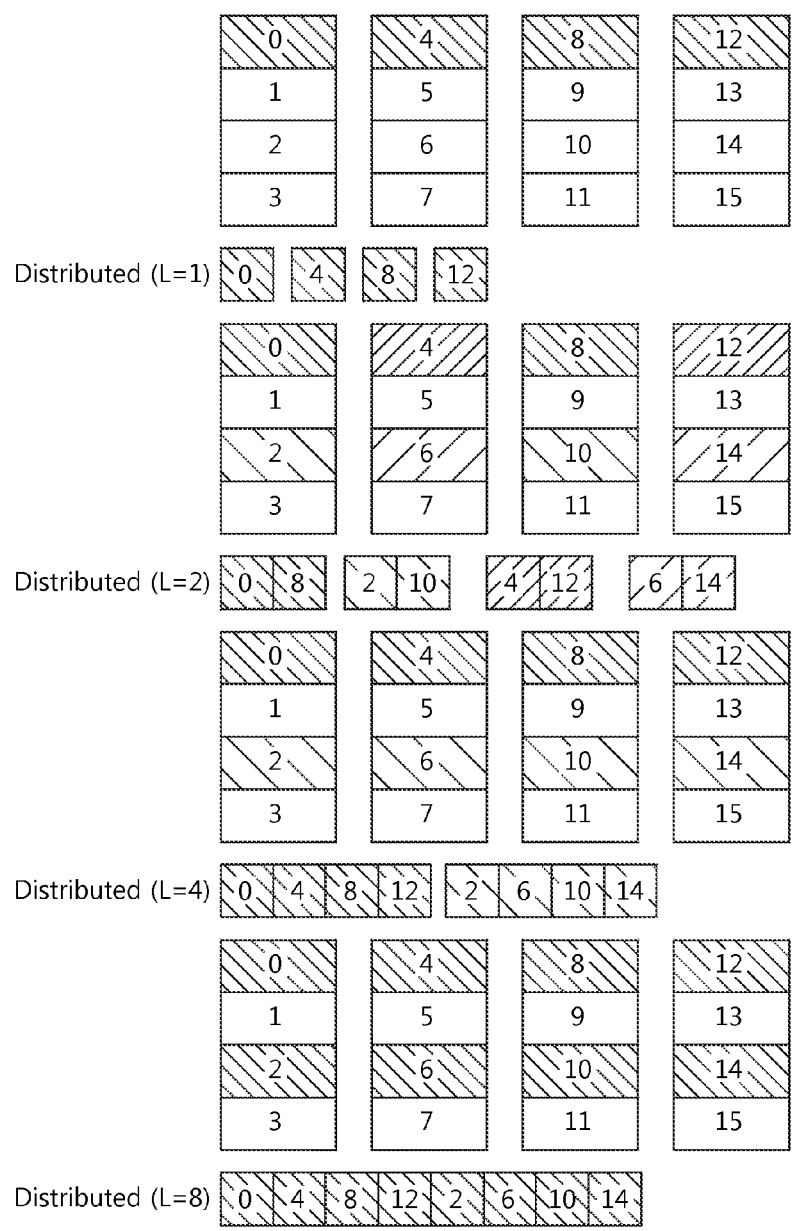
FIG. 28 shows another example of a method of configuring an aggregation level when distributed transmission is determined.

FIG. 28 shows another example of a method of configuring an aggregation level when distributed transmission is determined.

If L=1, a wireless device may sequentially monitor an EPDCCH candidate for each of 4 subsets corresponding to indices 0, 4, 8, and 12.

If L=2, the wireless device may sequentially monitor the EPDCCH candidate for each of four subset groups of {0, 8}, {2, 10}, {4, 12}, {8,14}.

If L=4, the wireless device may sequentially monitor the EPDCCH candidate for each of two subset groups {0, 4, 8, 12}, {2, 6, 10, 14}.

If L=8, the wireless device may monitor the EPDCCH candidate for one subset group {0, 4, 8, 12, 2, 6, 10, 14}.

In the above example, a size and the number of aggregation levels and a subset index corresponding to the aggregation level are for exemplary purposes only.

If one subset corresponds to one ECCE, one PRB pair may include four ECCEs. According to the exemplary embodiments of FIG. 22 to FIG. 28, if distributed transmission is determined, an ECCE for configuring an aggregation level is selected in unit of 4 ECCE indices. Accordingly, if L=4, the aggregation level is configured with an ECCE having an index {0, 4, 8, 12}.

The wireless device may be required to detect a plurality of EPDCCHs in one PRB pair. For example, the EPDCCH may be determined in each of an ECCE having an index 0 and an ECCE having an index 2. For this, an interval between indices constituting the aggregation level may be determined. For example, if an ECCE interval is 4, a first index 0 and a next index 4 are selected and thus EPDCCH candidates exist in different PRB pairs, whereas if the ECCE interval is 2, a first index 0 and a next index 2 are selected and thus two EPDCCH candidates may exist in one PRB pair. Therefore, a BS may send a UL grant by using an ECCE having an index 0, and may send a DL grant by using an ECCE having an index 2.

To acquire a greater diversity gain, the ECCE interval is preferably greater than the number of ECCEs included in one PRB pair.

A different ECCE interval may be configured for each aggregation level. For example, if L=1, an ECCE interval may be set to 4, and if L=2, 4, 8, the ECCE interval may be set to 2. The ECCE interval may be determined based on the value L.

According to the embodiment of FIG. 28, if L=2, the wireless device may sequentially monitor EPDCCH candidates for 4 ECCE groups {0, 8}, {2, 10}, {4, 12}, {8,14}. That is, the ECCE index is increased in the order of 0, 2, 4, and 6, and may be reconfigured in a direction of increasing a diversity gain, such as 0, 4, 2, and 6.

Although the aggregation level is configured based on an even-number index in FIG. 28, the aggregation level may also be configured based on an odd-number index (e.g., 1, 5, 9, 12, etc.). Alternatively, the aggregation level may be configured by combining the odd-number index and the even-number index (e.g., 0, 2, 5, 9, etc.).

Figure 29:
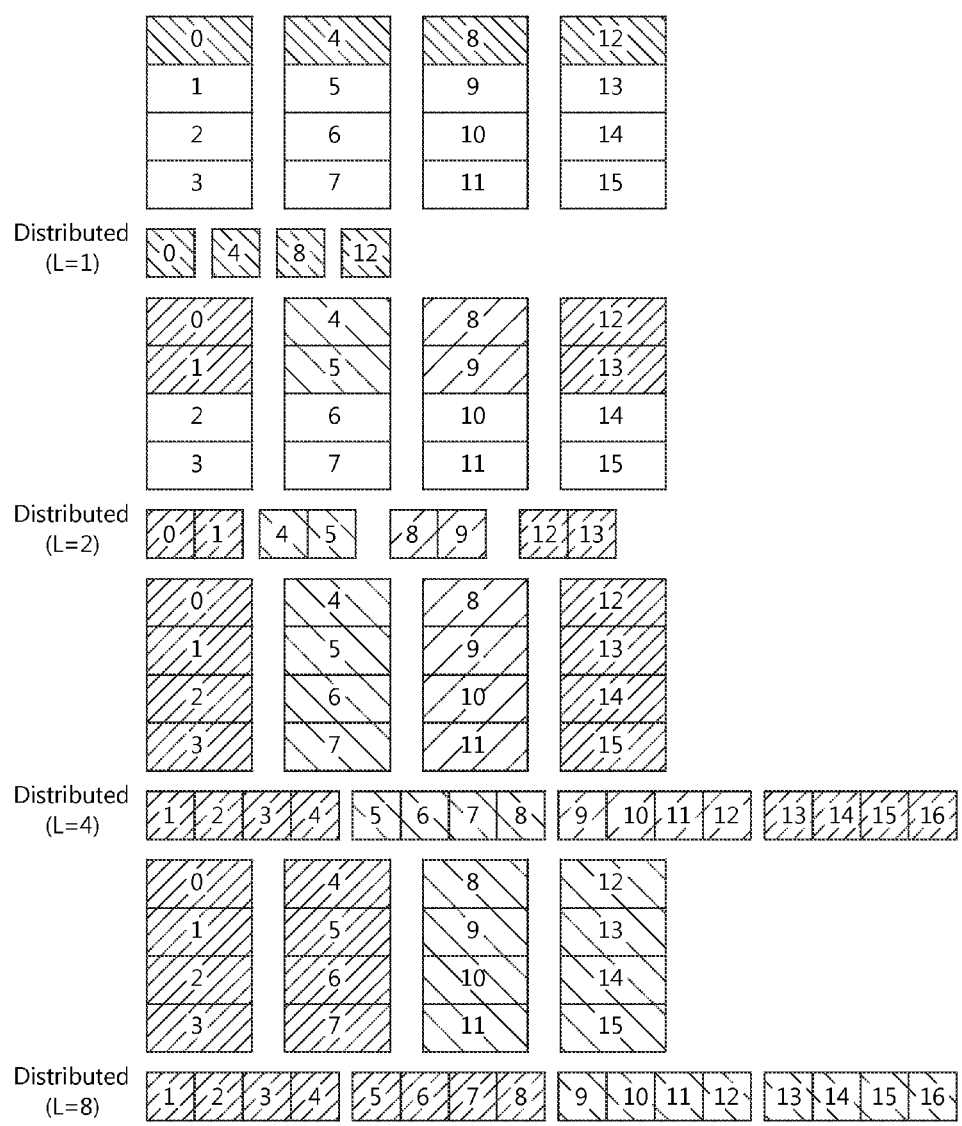
FIG. 29 shows an example of a method of configuring an aggregation level when localized transmission is determined.

FIG. 29 shows an example of a method of configuring an aggregation level when localized transmission is determined.

If L=1, a wireless device may sequentially monitor EPDCCH candidates for each of 4 subsets corresponding to indices 0, 4, 8, and 12.

If L=2, the wireless device may sequentially monitor EPDCCH candidates for 4 subset groups {0, 1}, {4, 5}, {8, 9}, {12,13}.

If L=4, the wireless device may sequentially monitor EPDCCH candidates for 4 subset groups {0, 1, 2, 3}, {4, 5, 6, 7}, {8, 9, 10, 11}, {12, 13, 14, 15}.

If L=8, the wireless device may monitor EPDCCH candidates for 2 subset groups {0, 1, 2, 3, 4, 5, 6, 7}, {8, 9, 10, 11, 12, 13, 14, 15}.

The wireless device may receive, from a BS, N PRB pairs for an EPDCCH search space and/or information indicating whether to perform localized transmission/distributed transmission. In addition, information regarding an offset for ECCE-to-RE mapping may be received from the BS. The offset may correspond to the cyclic shift offset indicated in the aforementioned embodiment of FIG. 17, FIG. 20, or FIG. 21. The offset may depend on the number of subsets (or ECCEs) included in a PRB pair.

Figure 30:
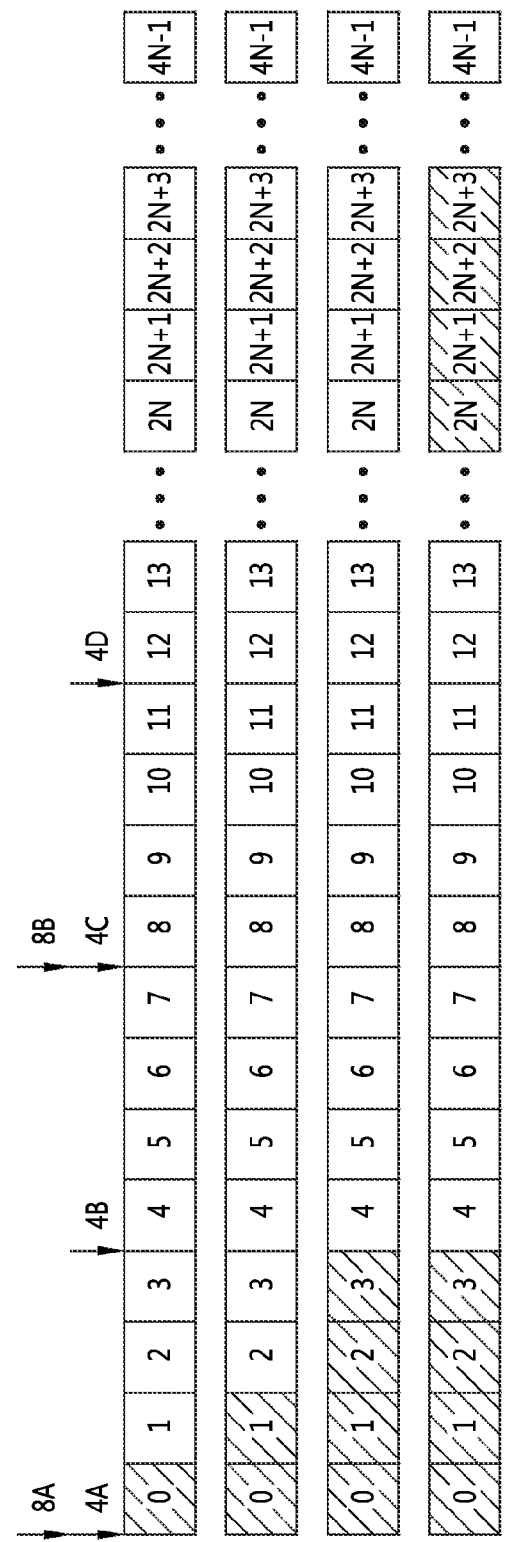
FIG. 30 shows an example of configuring a start point of an EPDCCH search space.

FIG. 30 shows an example of configuring a start point of an EPDCCH search space.

The start point of the EPDCCH search space may be an index corresponding to a multiple of 4 (e.g., 4A, 4B, 4C, 4D, . . . ) or may be an index corresponding to a multiple of 8 (8A, 8B).

FIG. 31 shows an example of distributed allocation. It is assumed herein that ECCEs are 1:1 mapped from an index 0 to an index 4N−1. An ECCE index is mapped in a frequency-first manner.

If L=1, an EPDCCH is mapped to an ECCE having an index 0. If L=2, the EPDCCH is mapped to ECCEs having indices 0 and 1. If L=4, the EPDCCH is mapped to ECCEs having indices 0, 1, 2, and 3. If L=8, the EPDCCH may be mapped across at least 8 PRB pairs. However, although the number of PRB pairs to be allocated is increased when a size of an aggregation level is increased, the remaining ECCEs other than a corresponding ECCE cannot be used as a PDSCH. Therefore, if L=8, the EPDCCH may be mapped to 4 PRB pairs in such a manner that 2 ECCEs are mapped to one PRB pair. That is, the EPDCCH may be mapped to ECCEs having indices 0, 1, 2, 3, 2N, 2N+1, 2N+2, 2N+3. '2N' may be predetermined, or may be reported by the BS to the wireless device.

Figure 32:
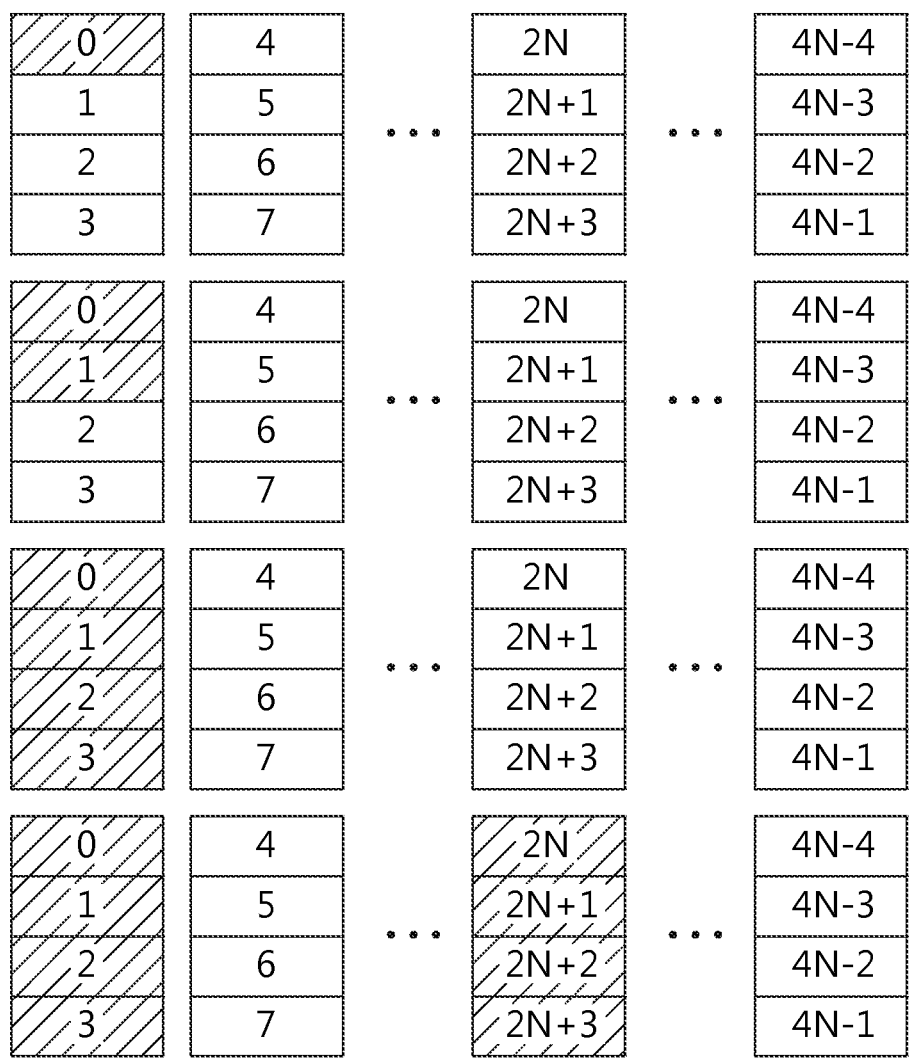
FIG. 32 shows an example of localized allocation.

FIG. 32 shows an example of localized allocation. It is assumed herein that indices from 0 to 4N−1 of FIG. 30 are 1:1 mapped to ECCEs. An ECCE index is mapped in a time-first manner. Each PRB pair includes ECCEs having contiguous indices.

If L=1, 2, 3, an EPDCCH may be mapped to one PRB pair. If L=8, the EPDCCH may be mapped to two PRB pairs.

Although it is assumed in the aforementioned embodiment that a unit of configuring an aggregation level is a subset or an ECCE, this is for exemplary purposes only. 2 ECCEs may be included when L=1. Likewise, 4 ECCEs[4 CCE→4 ECCE] may be included when L=2.

The ECCE may include 4 EREGs or 8 EREGs. For example, the ECCE may include 4 EREGs in a normal CP case, and may include 8 EREGs in an extended CP case. To configure an EPDCCH search space, the proposed method may be applied to determine how to configure an aggregation level from an ECCE in each PRB pair or whether to designate a start point.

There may be a localized ECCE constructed from an EREG in one single PRB pair and a distributed ECCE constructed from an EREG in a plurality of PRBs. To ensure a commonality of the EREG index configuring the localized ECCE and the EREG index configuring the distributed ECCE, K distributed ECCEs may be constructed by re-distributing K localized ECCEs located in different PRB pairs.

Figure 33:
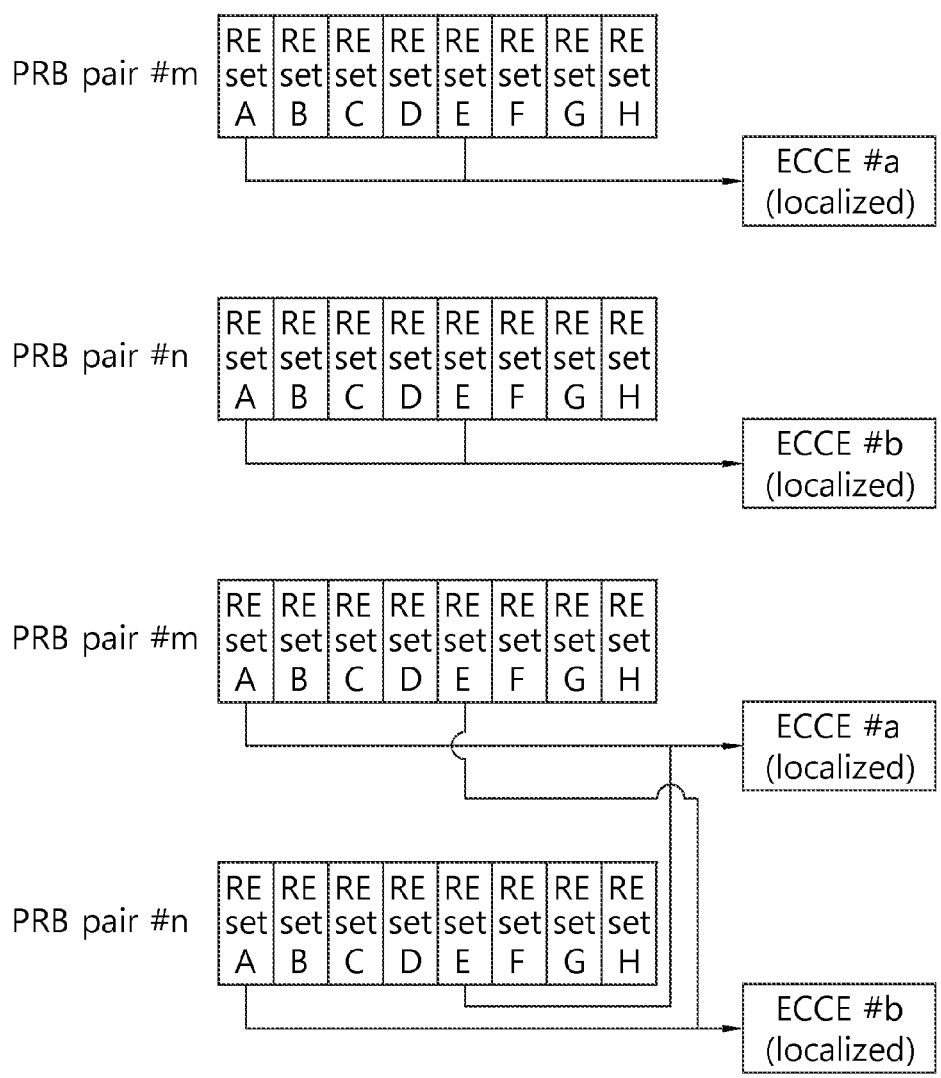
FIG. 33 shows an example of constructing a distributed enhanced control channel element (ECCE) from a localized ECCE.

FIG. 33 shows an example of constructing a distributed ECCE from a localized ECCE.

Assume that a PRB pair #m includes 8 RE sets A, B, C, D, E, F, G, and a PRB pair #n includes 8 RE sets A, B, C, D, E, F, G.

If K=2, the RE sets A and E of the PRB pair #m are combined to form a localized ECCE #a, and the RE sets A and E of the PRB pair #n are combined to form a localized ECCE #b.

When the distributed ECCE is formed, four RE sets constituting the localized ECCE are re-combined. The RE set A of the PRB pair #m and the RE set E of the PRB pair #n may be combined to form the distributed ECCE #a, and the RE set E of the PRB pair #m and the RE set A of the PRB pair #n are combined to form the distributed ECCE #b.

K distributed ECCE indices may be 1:1 mapped to K localized ECCE indices. Therefore, even if the distributed ECCE is transmitted across a plurality of PRB pairs, it may co-exist with the localized ECCE, and an ECCE index may be assigned thereto.

Figure 34:
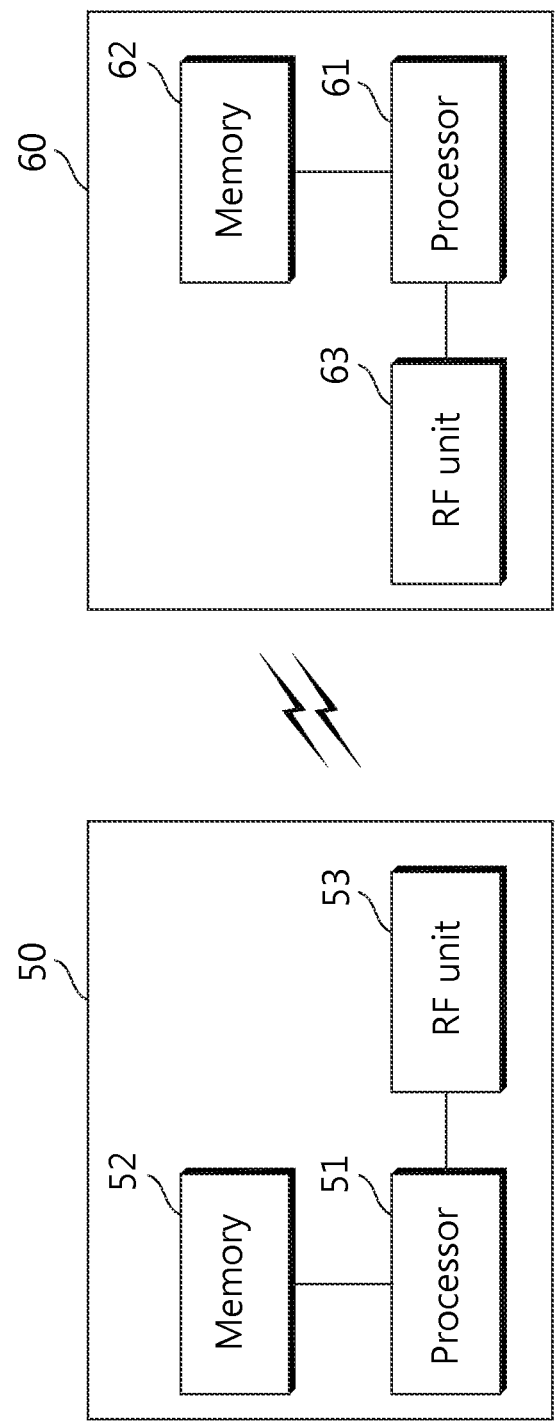
FIG. 34 is a block diagram showing a wireless communication system according to an embodiment of the present invention.

FIG. 34 is a block diagram showing a wireless communication system according to an embodiment of the present invention.

ABS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. The processor 51 may configure an EPDCCH search space for one or more PRB pairs, and may transmit the EPDCCH.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. The processor 61 may monitor an EPDCCH in an EPDCCH search space.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for monitoring a control channel in a wireless communication system, the method comprising:
receiving, by a wireless device from a base station, information for a search space in which a downlink control channel is monitored, wherein the received information includes first information indicating a plurality of physical resource block (PRB) pairs used for the search space, wherein the received information further includes second information indicating either a localized transmission or distributed transmission, and wherein the received information further includes third information indicating an offset value used for a mapping of the downlink control channel; and monitoring, by the wireless device, the downlink control channel in the search space of a subframe, wherein the downlink control channel is monitored in at least one enhanced control channel element (ECCE) in the search space, each of the at least one ECCE including a plurality of enhanced resource element groups (EREGs), wherein, if the second information indicates the localized transmission, the plurality of EREGs in each of the at least one ECCE are mapped to one of the plurality of PRB pairs, wherein, if the localized transmission is used, the plurality of EREGs are associated with a single antenna port selected from a plurality of antenna ports based on an index of the at least one ECCE and the wireless device's specific information, and wherein, if the second information indicates the distributed transmission, the plurality of EREGs in each of the at least one ECCE are mapped to the plurality of PRB pairs, and the plurality of EREGs are associated with two antenna ports of the plurality of antenna ports.

2. The method of claim 1, wherein the downlink control channel is demodulated by using a demodulation reference signal that is generated based on an identifier.

3. The method of claim 1, wherein each of the at least one ECCE includes 4 EREGs or 8 EREGs.

4. The method of claim 1, wherein each of the plurality of PRB pairs includes two PRBs contiguous in the same frequency domain.

5. The method of claim 1, wherein the received information further includes fourth information indicating the subframe in which the downlink control channel is monitored.

6. A wireless device for monitoring a control channel in a wireless communication system, the wireless device comprising:

a radio frequency (RF) unit configured to transmit and receive a radio signal; and a processor operatively coupled to the RF unit and configured to:

receive, via the RF unit from a base station, information for a search space in which a downlink control channel is monitored, wherein the received information includes first information indicating a plurality of physical resource block (PRB) pairs used for the search space, wherein the received information further includes second information indicating either a localized transmission or distributed transmission, and wherein the received information further includes third information indicating an offset value used for a mapping of the downlink control channel; and monitor the downlink control channel in the search space of a subframe, wherein the downlink control channel is monitored in at least one enhanced control channel element (ECCE) in the search space, each of the at least one ECCE including a plurality of enhanced resource element groups (EREGs), wherein, if the second information indicates the localized transmission, the plurality of EREGs in each of the at least one ECCE are mapped to one of the plurality of PRB pairs, wherein, if the localized transmission is used, the plurality of EREGs are associated with a single antenna port selected from a plurality of antenna ports based on an index of the at least one ECCE and the wireless device's specific information, and each of the antenna ports is mapped to one of a plurality of wireless devices, and wherein, if the second information indicates the distributed transmission, the plurality of EREGs in each of the at least one ECCE are mapped to the plurality of PRB pairs, and the plurality of EREGs are associated with two antenna ports of the plurality of antenna ports.

7. The wireless device of claim 6, wherein the downlink control channel is demodulated by using a demodulation reference signal that is generated based on an identifier.

8. The wireless device of claim 6, wherein each of the at least one ECCE includes 4 EREGs or 8 EREGs.

9. The wireless device of claim 6, wherein each of the plurality of PRB pairs includes two PRBs contiguous in the same frequency domain.

10. The wireless device of claim 6, wherein the received information further includes fourth information indicating the subframe in which the downlink control channel is monitored.

11. The method of claim 1, further comprising:

receiving information indicating an allocation of the single antenna port to the one of the plurality of wireless devices.

12. The wireless device of claim 6, wherein the processor is further configured to receive, via the RF unit, information indicating an allocation of the single antenna port to the one of the plurality of wireless devices.

* * * * *